(12) United States Patent
Komatsu et al.

(10) Patent No.: US 7,038,397 B2
(45) Date of Patent: May 2, 2006

(54) COLD CATHODE FLUORESCENT LAMP DRIVER CIRCUIT

(75) Inventors: Akeyuki Komatsu, Saijo (JP); Eiji Miyake, Ozu (JP); Kenji Kawataka, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 140 days.

(21) Appl. No.: 10/887,110

(22) Filed: Jul. 8, 2004

(65) Prior Publication Data

US 2005/0023988 A1 Feb. 3, 2005

(30) Foreign Application Priority Data

Jul. 30, 2003 (JP) .............................. 2003-282644
May 24, 2004 (JP) .............................. 2004-153772

(51) Int. Cl.
*H05B 37/00* (2006.01)

(52) U.S. Cl. .................... 315/276; 315/224; 315/324
(58) Field of Classification Search ............. None
See application file for complete search history.

(56) References Cited

U.S. PATENT DOCUMENTS

2005/0146286 A1* 7/2005 Chan et al. ................. 315/276

FOREIGN PATENT DOCUMENTS

JP 8-273862 10/1996

* cited by examiner

*Primary Examiner*—David Vu
(74) *Attorney, Agent, or Firm*—Pearne & Gordon LLP

(57) ABSTRACT

A first block (1) converts a DC voltage (Vi) into an AC voltage (V) of a high frequency, using a high-frequency oscillator circuit (4) and a step-up transformer (5). The first block (1) acts as a low-impedance power supply owing to suppression of leakage flux in the step-up transformer (5). A second block (2) and a third block (3) are connected to each CCFL (20). A ballast inductor (LB) causes the CCFL (20) to shine through the resonance with a matching capacitor (CM), and then maintains the stable lamp current during shining of the CCFL (20). The capacitance of the matching capacitor (CM) is separately adjusted for each CCFL (20), and thereby, the total impedance of the matching capacitor (CM) and the surrounding stray capacitances is matched to the impedance of the series connection of the ballast inductor (LB) and an overcurrent protection capacitor (CP).

21 Claims, 14 Drawing Sheets

COLD CATHODE FLUORESCENT LAMP DRIVER CIRCUIT

BACKGROUND OF THE INVENTION

The present invention relates to a circuit for driving a cold cathode fluorescent lamp (CCFL) and, in particular, the circuit for driving more than one CCFL.

A fluorescent lamp is broadly divided into a hot-cathode type and a cold-cathode type by constituent of the electrodes. In the cold cathode fluorescent lamp (CCFL), the electrodes consist of materials that radiate many electrons due to high voltages applied. In other words, the electrodes include no filament for thermionic emission, in contrast to the hot cathode fluorescent lamp. Thereby, the CCFL has the advantages over the hot cathode fluorescent lamp especially in its much smaller diameter tube, its longer life, and its lower power consumption. Because of these advantages, the CCFLs are extensively used for, in particular, the products strongly required to reduce the thickness (or size) and lower the power consumption, such as the backlights of liquid crystal displays and the light sources of FAXs and scanners.

The CCFL has, when compared to the hot cathode fluorescent lamp, the following electric characteristics: its breakdown voltage is higher; its discharge current (which is hereafter referred to as a lamp current) is smaller; and its impedance is higher. The CCFL has, in particular, the negative resistance characteristics, that is, its resistance value sharply drops with increase in lamp current.

The CCFL driver circuit is designed to match these electric characteristics of the CCFL. In particular, reduction in thickness (and size) of devices and lowering in power consumption are of importance in uses of the CCFLs, and accordingly, the CCFL driver circuit is strongly required to reduce its size (in particular, thickness) and lower its power consumption as well.

For example, the following is known as a conventional CCFL driver circuit. See, for example, Published Japanese patent application H08-273862 gazette. FIG. 12 is the circuit diagram showing the configuration of the conventional CCFL driver circuit. The conventional CCFL driver circuit comprises a high-frequency oscillator circuit 100, a step-up transformer T, and an impedance matching section 200. The high-frequency oscillator circuit 100 converts a direct voltage from a direct-current power supply DC into an alternating voltage of a high frequency, and applies the direct voltage across the primary winding L1 of the step-up transformer T. The step-up transformer T generates a voltage V across the secondary winding L2. The secondary voltage V is much higher than the primary voltage and applied across the CCFL FL through the impedance matching section 200. The impedance matching section 200 includes, for example, a series circuit of a choke coil L and a capacitor C. Here, the capacitor C includes stray capacitances around the CCFL FL. Impedance matching is achieved between the step-up transformer T and the CCFL FL by the adjustment with the inductance of the choke coil L and the capacity of the capacitor C.

A voltage is applied across the primary winding L1 of the transformer T when the CCFL FL stays out, and then, the voltage VR across the CCFL FL abruptly rises and exceeds the breakdown voltage because of the resonance between the choke coil L and the capacitor C in the impedance matching section 200. Thereby, the CCFL FL starts discharge and shining. Then, the resistance value of the CCFL FL sharply drops with increase in the lamp current IR, due to the negative resistance characteristics. Following that, the voltage VR across the CCFL FL falls. At that time, the impedance matching section 200 acts to maintain the stable lamp current IR, regardless of the changes in the voltage VR across the CCFL FL. In other words, the luminosity of the CCFL FL is maintained with stability.

The secondary winding L2 of the step-up transformer T and the choke coil L are represented as separate circuit elements in FIG. 12. In the actual CCFL driver circuit, however, the secondary winding of a leakage transformer performs three functions; step-up, choke, and impedance-matching functions, as follows. FIG. 13 is a perspective view schematically showing the appearance of the leakage transformer T used in the conventional CCFL driver circuit as a transformer for the power supply. FIG. 14 is a cross-sectional view of the leakage transformer T taken along a line XIV—XIV shown in FIG. 13. The arrows shown in FIG. 13 represent the eye direction. In the leakage transformer T, the primary winding L1 and the secondary winding L2 are wound around the rod-shaped core CR so as to be located adjacent to each other. Here, a first partition D1 is provided between the primary winding L1 and the secondary winding L2 to prevent electric discharge between the both windings. Similarly, a plurality of second partition D2 divides the secondary winding L2 to reduce stray capacitances between the lines of the winding, while preventing electric discharge between the lines of the winding. The stray capacitances are hereafter referred to as line-to-line capacitances. A split winding refers to such a winding of a width divided by partitions. The step-up ratio of the leakage transformer T depends on a turn ratio between the primary winding L1 and the secondary winding L2. Since the step-up ratio is high, in general, the turns of the secondary winding L2 are larger in number than the turns of the primary winding L1. Accordingly, the secondary winding L2 is larger in width than the primary winding L1, in general. In the leakage transformer T, in addition, the primary winding L1 and the secondary winding L2 are wound around the rod-shaped core CR and located adjacent to each other. Therefore, the leakage transformer T has the large leakage flux, and thereby, has the high output impedance. The inductive component of this high output impedance, that is, the leakage inductance resonates with the capacitor C, and acts as the above-described choke coil L. See FIG. 12. In the leakage transformer T, furthermore, the above-described leakage inductance and the line-to-line capacitance of the secondary winding L2 are easily adjusted. Accordingly, the impedance matching section 200 is easily composed of the secondary winding L2 and the above-described capacitor C.

The leakage transformer T is easily designed as described above, and in particular, the secondary winding L2 can be used as the above-described choke coil L. Accordingly, for the conventional CCFL driver circuits, leakage transformers are considered to have advantages especially in miniaturization, and therefore, extensively used.

The backlights of liquid crystal display, in particular, require high luminosity. Accordingly, the installation of more than one CCFL is desirable for use as the backlights. At that time, the luminosity must be made uniform among those CCFLs. Furthermore, the CCFL driver circuit in miniature size is necessary. Parallel driving of those CCFLs by a common power supply is desirable in order to meet those requirements.

However, the parallel driving is difficult for the following reason: CCFLs have negative resistance characteristics as described above. Accordingly, just in a parallel connection of more than one CCFL, the currents are concentrated into only one CCFL, and after all, only one CCFL can shine.

Furthermore, when many CCFLs are connected to a common power supply, the wiring arrangements between the CCFLs and the power supply are different from each other, in particular, in wire length. Accordingly, the stray capacitances vary among the CCFLS. Therefore, in the parallel driving of more than one CCFL, each lamp current of the CCFLs should be separately controlled, and thereby, variations of the lamp currents be suppressed. It is difficult to achieve all the following: using a leakage transformer as a common choke coil among more than one CCFL, matching the impedance of the leakage transformer to the impedance of each CCFL, and controlling each lamp current with high precision. Here, the difficulty is similar when a piezoelectric transformer is used instead of the leakage transformer.

Therefore, the conventional CCFL driver circuit is equipped with one power supply (in particular, a leakage transformer) for each CCFL, and makes each power supply control a lamp current to be uniform. In other words, the power supplies as many as the CCFLs are necessary for the conventional CCFL driver circuit. As a result, reduction in component count is difficult, and thereby, further miniaturization of the whole device is difficult.

SUMMARY OF THE INVENTION

An object of the present invention is to provide a CCFL driver circuit that causes more than one CCFL to uniformly shine with a common power supply, and thereby allows its further miniaturization.

The CCFL driver circuit according to the present invention comprises:

more than one ballast, at least one of which is connected to at least an electrode at one end of each of more than one CCFL; and a low-impedance power supply powering the CCFL through the ballast and having an output impedance lower than the total impedance of the CCFLs.

This CCFL driver circuit is preferably installed in the following liquid crystal display. The liquid crystal display comprises more than one CCFL; and a liquid crystal panel installed in front of the CCFLs and interrupting lights emitted from the CCFLs in a predetermined pattern. The above-described CCFL driver circuit according to the present invention drives the above-described CCFLs as the backlight of the liquid crystal display.

Among more than one CCFL, there are, in general, variations in characteristics and differences in wiring arrangements that lead to variations in the surrounding stray capacitances. Furthermore, fluctuations in environmental conditions such as temperature cause variations in the operating conditions of the CCFLs. The output impedance of the power supply is suppressed in the above-described CCFL driver circuit according to the present invention, contrary to premises for conventional driver circuits. Instead, each of the CCFLs is connected to one of the ballasts. At that time, the ballasts operate in virtual isolation from each other owing to the low output impedance of the power supply. Thereby, the above-described variations are cancelled with high accuracy for every CCFL. In other words, no variation in the lamp currents occurs among more than one CCFL. Accordingly, a uniform and stable luminosity is maintained among more than one CCFL. Thus, the above-described CCFL driver circuit according to the present invention may cause more than one CCFL to shine with uniformity and stability using the common low-impedance power supply.

The ballasts operate in virtual isolation from each other owing to the low output impedance of the power supply, in the above-described CCFL driver circuit according to the present invention. Thereby, the lamp currents have no variations among more than one CCFL, even if the wires between the low-impedance power supply and the ballasts are long, and in addition, the wiring arrangements greatly vary among the ballasts. Accordingly, the flexibility of the wiring layout is high. Therefore, the miniaturization of the whole device is easily achieved.

As a result of the above description, the above-described CCFL driver circuit according to the present invention, when installed in the above-described liquid crystal display, allows the liquid crystal display to easily achieve further reduction in thickness, with the luminosity of the liquid crystal display maintained to be high and uniform over the whole panel.

In the above-described CCFL driver circuit according to the present invention, preferably, the low-impedance power supply comprises a transformer connected to the ballast and having an output impedance lower than the total impedance of the CCFLs. Thus, the power supply with low output impedance is realized since the output impedance of the transformer is restrained, contrary to the premise for conventional driver circuits.

As an effective means of reducing the output impedance of the transformer, for example, the transformer may include a core, a primary winding wound around the core, and a secondary winding wound on the inside, outside, or both sides of the primary winding. Thereby, the output impedance is restrained since the leakage flux is reduced. Furthermore, the leakage flux is avoided from affecting the peripheral devices, for example, producing noises. Here, the secondary winding of the transformer may have a split or honeycomb winding structure. Thereby, the line-to-line capacitances are reduced, and hence, the self-resonance frequency of the secondary winding can beset to be high enough. Accordingly, the above-described CCFL driver circuit according to the present invention can establish sufficiently high driving frequencies of more than one CCFL with the stable luminosities of the CCFLs maintained. Therefore, a size reduction of the transformer and the thereby miniaturization of the whole device are easily achieved.

In the above-described CCFL driver circuit according to the present invention, the low-impedance power supply may comprise a power transistor connected to the ballast, instead of the above-described transformer. The use of power transistor can reduce its output impedance easily and effectively. Accordingly, the above-described CCFL driver circuit according to the present invention can cause a larger number of CCFLs to uniformly shine.

The ballast preferably includes an inductor in the above-described CCFL driver circuit according to the present invention. Thereby, the inductor acts as a choke coil. In other words, the resonance between the inductor and the stray capacitances around the CCFL apply a high voltage beyond the breakdown voltage across the CCFL. Here, the actual breakdown voltages vary among the CCFLs. However, at least one of the ballasts is connected to each of the CCFLs in the above-described CCFL driver circuit according to the present invention. Accordingly, a voltage application from the common low-impedance power supply causes all the CCFLs to reliably shine, regardless of variations of the actual breakdown voltages.

The inductor may have a split or honeycomb coil in the above-described ballast. Thereby, its line-to-line capacitances are reduced, and hence, the self-resonance frequency of the inductor can be set to be high enough. Accordingly, the above-described CCFL driver circuit according to the present invention can establish sufficiently high driving frequencies of the CCFLs with the stable luminosities of the CCFLs maintained. Therefore, size reductions of the ballasts and the thereby miniaturization of the whole device are easily achieved.

The inductor may further include a saturable reactor in the above-described ballast. When the discharge in the CCFL is suddenly interrupted and the voltage across the CCFL sharply rises, the saturation of the inductance of the ballast prevents the voltage from further rising. Thus, overvoltage is prevented, and therefore, the above-described CCFL driver circuit according to the present invention secures a high level of safety.

The above-described ballast may include a capacitor, which is hereafter is referred to as a ballast capacitor, in the above-described CCFL driver circuit according to the present invention. The ballast capacitor preferably includes a capacitance between layers in a circuit board. Here, the circuit board is, for example, a flexible printed circuit board or a multilayer substrate, on which the above-described CCFL driver circuit according to the present invention, in particular, its joint parts with the CCFLs are mounted. Thus, the ballast capacitor can be easily reduced in size, and therefore, the miniaturization of the whole of the above-described CCFL driver circuit according to the present invention is easily achieved.

The above-described CCFL driver circuit according to the present invention preferably comprises matching capacitors, at least one of which is connected between the electrodes at both ends of each CCFLs. The matching capacitor may include, for example, a capacitance between layers in a circuit board. More preferably, the impedance of the matching capacitor is matched to the impedance of the ballast. Further preferably, the impedance of the ballast, the total impedance of the matching capacitor and stray capacitances around the CCFL, and the impedance of the CCFL during the shining conditions are matched to each other. Thus, the impedance matching between the ballast and the CCFL (and the surrounding stray capacitances) is achieved in every combination of the ballast and the CCFL. Thereby, among more than one CCFL, uniform lamp currents are maintained, and therefore, uniform luminosities are maintained, regardless of variations in characteristics, the surrounding stray capacitances, and voltages across the ends, among the CCFLs.

The above-described CCFL driver circuit according to the present invention preferably comprises matching capacitors, at least one of which is connected between a ground and each of the electrodes at the both ends of the CCFLs. Thereby, in each of the CCFLs, the center level of the electrode potentials of the both ends is maintained at the ground potential, and in other words, the electrode potentials at the both ends are maintained to be anti-symmetric with respect to the ground potential. Accordingly, in each of the CCFLs, the distribution of the leakage currents flowing between parts of the tube wall and the outside is symmetric with respect to the center of the CCFL. Therefore, the variations in luminosity along the length of each CCFL are reduced, and in other words, the uniformity in luminosity is improved.

Furthermore, when the center level of the electrode potentials of the both ends of the CCFL is maintained at the ground potential, the amplitude of the electrode potential with respect to the ground potential can be reduced by half with the amplitude of the voltage across the CCFL maintained, in contrast to the case of an electrode at one end of the CCFL grounded. Thereby, the leakage currents themselves are reduced, and therefore, the deviation of the distribution are reduced. Accordingly, the variations in luminosity along the length of each CCFL are further reduced, and in other words, the uniformity in luminosity is further improved.

In addition, when the center level of the electrode potentials of the both ends of the CCFL is maintained at the ground potential, the withstand voltage of each of the above-described matching capacitors can be reduced by half, in contrast to the case of an electrode at one end of the CCFL grounded. Accordingly, size reductions of the above-described matching capacitors are easily achieved.

As a means of maintaining the center level of the electrode potentials of the both ends of each CCFL at the ground potential, apart from the above-described means, for example, one of the ballasts may be connected to each of the electrodes at the both ends of the CCFLs; and two of the low-impedance power supplies may be provided, and each of them may be connected through one of the ballasts to one of the electrodes at the both ends of the CCFLs, and the outputs of the low-impedance power supplies may be maintained in opposite phases.

Thus, in each of the CCFLs, the electrode potentials at the both ends are maintained with high accuracy to be anti-symmetric with respect to the ground potential. Furthermore, the upper limit of the output voltage of each of the low-impedance power supplies can be reduced by half with the upper limit of the voltages across the CCFLs maintained to be high. Accordingly, the withstand voltages of the circuit elements are restrained in the above-described CCFL driver circuit according to the present invention. Therefore, the miniaturization of the whole device is easily achieved with the high luminosities of the CCFLs maintained.

At that time, more preferably, the low-impedance power supply is mounted on a first circuit board;

the ballasts connected to the electrodes at one-side ends of the CCFLs are mounted on a second circuit board; and the ballasts connected to the electrodes at the other-side ends of the CCFLs are mounted on a third circuit board.

Further preferably, one end of the CCFL is fixed on the second circuit board, and the other end of the CCFL is fixed on the third circuit board. In general, other circuit elements such as the ballasts are smaller in size than the low-impedance power supply. Accordingly, when the first circuit board equipped with the low-impedance power supply is separated from other circuit boards, the parts consisting of the second and third circuit boards and the CCFLs are easily reduced in thickness. For example, when the CCFLs are installed in the above-described liquid crystal display, the thickness of the liquid crystal display is easily reduced.

Alternatively, the low-impedance power supply and the ballasts connected to the electrode at one-side ends of the CCFLs may be mounted on a first circuit board; and the ballasts connected to the electrodes at the other-side ends of the CCFLs may be mounted on a second circuit board.

The power supply has the low output impedance in the above-described CCFL driver circuit according to the present invention, and accordingly, the ballasts operate in virtual isolation from each other. Thereby, the lamp currents have no variations among the CCFLS, even if the wires between the low-impedance power supply and the ballasts are long, and in addition, the wiring arrangements greatly vary among the ballasts. Accordingly, the above-described separation of the circuit boards is easily achieved with the uniform luminosities maintained among the CCFLS, in contrast to the conventional circuits.

In addition, the following may be used as a means of maintaining the center level of the electrode potentials of the both ends of each CCFLs at the ground potential, apart from the above-described means. In the above-described CCFL driver circuit according to the present invention, when the low-impedance power supply includes the above-described transformer, preferably, one of the ballasts is connected to each of the electrodes at the both ends of the CCFLs; and the above-described transformer includes a secondary winding with a neutral point grounded, each end of which is connected to one of the electrodes at the both ends of the CCFLs through one of the ballasts.

Thereby, the center level of the electrode potentials of the both ends of each CCFL can be maintained at the ground potential with the small number of circuit elements maintained.

A CCFL driver circuit according to the present invention uses the common low-impedance power supply and a plurality of the ballasts, at least one of which is connected to each of more than one CCFL, and thereby, causes the CCFLs to shine with uniformity and stability using the common power supply, in contrast to the conventional circuits. Furthermore, the wires between the power supply and the ballasts may be long, and in addition, the wiring arrangements may greatly vary among the ballasts. Accordingly, the flexibility in layout for the wirings is high. Therefore, the miniaturization of the whole device is more easily achieved than conventional circuits. For example, when the above-described CCFL driver circuit according to the present invention is used for the backlight of the liquid crystal display, the thickness of the display is easily reduced.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

The following explains the best embodiments of the present invention, referring to the figures.

EMBODIMENT 1

Figure 1:
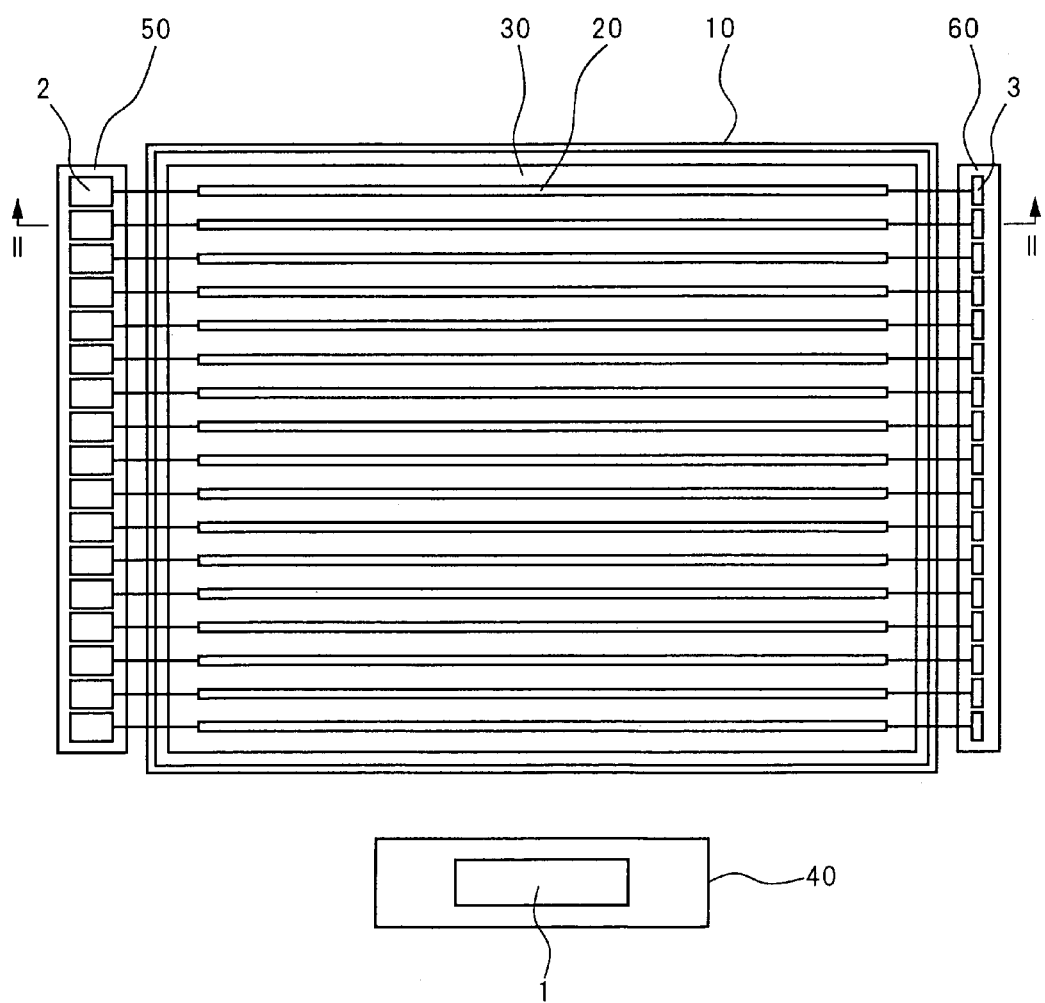
FIG. 1 is a front view showing the inside of a liquid crystal display equipped with a CCFL driver circuit according to Embodiment 1 of the present invention.
Figure 2:
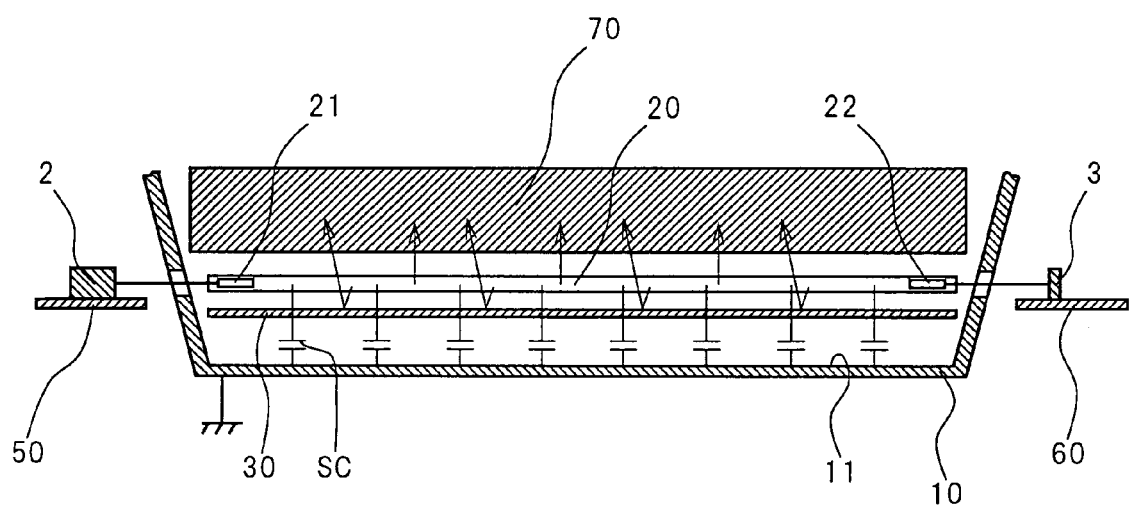
FIG. 2 is a cross-sectional view of the liquid crystal display taken along the line II—II shown in FIG. 1.

FIG. 1 is a front view showing the inside of a liquid crystal display equipped with a CCFL driver circuit according to Embodiment 1 of the present invention. FIG. 2 is a cross-sectional view of the liquid crystal display taken along the line II—II shown in FIG. 1. The arrows shown in FIG. 1 represent the eye direction. This liquid crystal display comprises a case 10, more than one CCFL 20, a reflector 30, a first circuit board 40, a second circuit board 50, a third circuit board 60, and a liquid crystal panel 70. The CCFL driver circuit according to Embodiment 1 of the present invention is mainly divided into three blocks 1, 2, and 3, which are mounted on the first circuit board 40, the second circuit board 50, and the third circuit board 60, respectively.

The case 10 is, for example, a metallic box that is grounded. The front side of the case 10 is open. The reflector 30, the CCFLs 20, and the liquid crystal panel 70 (not shown in FIG. 1) are placed in order from the back of the inside of the case 10. More than one CCFL 20 (for example, sixteen) are included, each fixed in a horizontal position, and evenly spaced in the vertical direction. The second circuit board 50 and the third circuit board 60 are placed on the both sides of the case 10, respectively. The both ends of each CCFL 20 are fixed on the second circuit board 50 and the third circuit board 60, respectively. Furthermore, the electrodes 21 and 22 at the both ends of each CCFL 20 are connected to the second and third blocks, 2 and 3, of the CCFL driver circuit, respectively.

The second and third blocks, 2 and 3, are connected to the first block 1 installed on the first circuit board 40. The wirings are not shown. The first circuit board 40 is placed in a part separated from the case 10, for example, a power unit of the liquid crystal display (not shown). The first block 1 is connected to a direct-current power source (not shown). The CCFL driver circuit distributes the power supplied by the direct-current power source among the CCFLs 20 through the three blocks 1, 2, and 3. Thereby, the CCFLs 20 shine. The lights emitted by the CCFLs 20 are entered into the liquid crystal panel 70 directly or reflected by the reflector 30. See the arrows shown in FIG. 2. The liquid crystal panel 70 interrupts the incident lights from the CCFLs 20 in predetermined patterns. Thereby, the patterns show up on the front of the liquid crystal panel 70.

Figure 3:
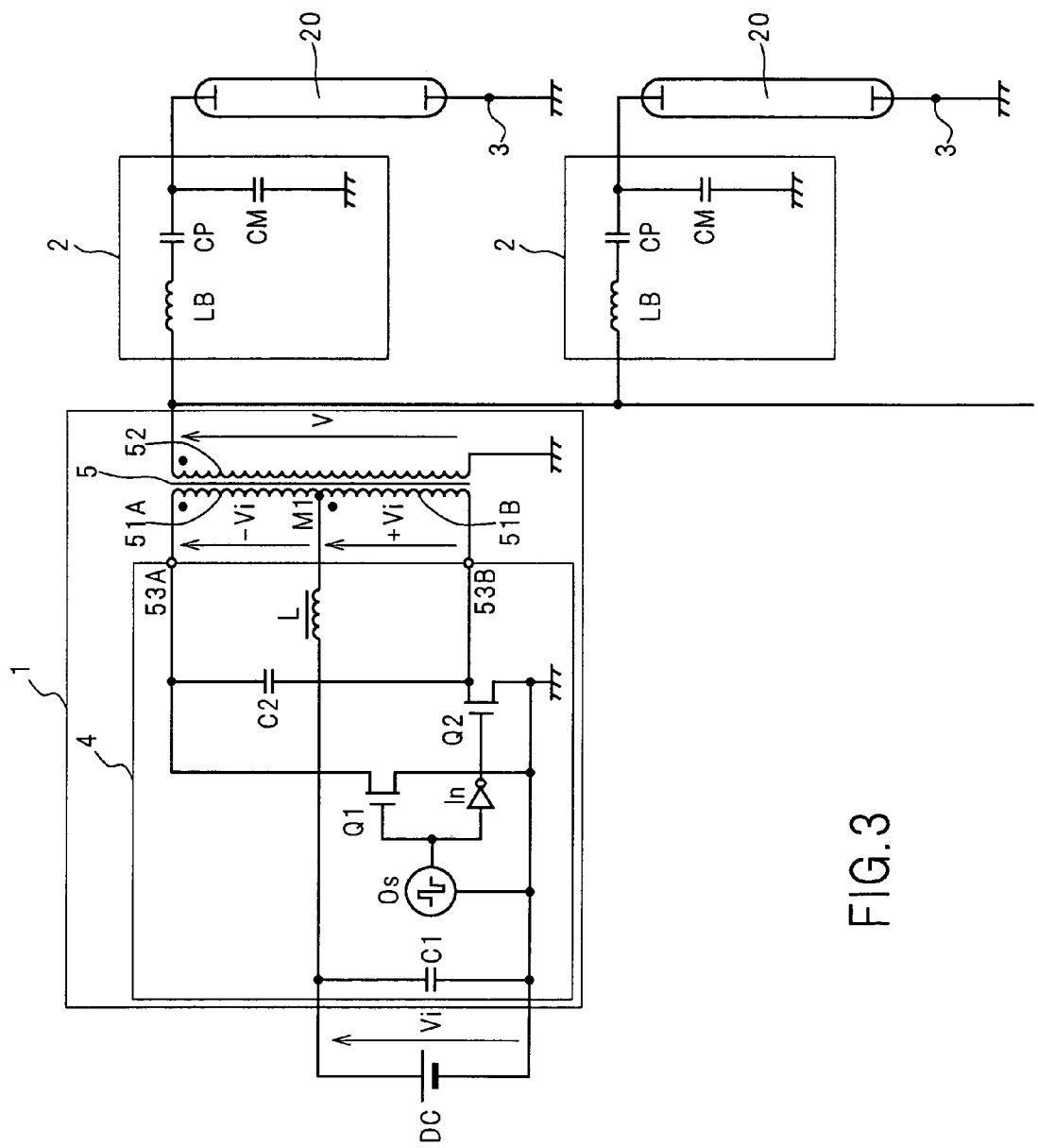
FIG. 3 is a circuit diagram showing the configuration of the CCFL driver circuit according to Embodiment 1 of the present invention.

FIG. 3 is the circuit diagram showing the configuration of the CCFL driver circuit according to Embodiment 1 of the present invention. The CCFL driver circuit mainly consists of the above-described three blocks 1, 2, and 3. The first block 1 comprises a high-frequency oscillator circuit 4 and a step-up transformer 5, and is configured as a parallel resonant push-pull inverter. The high-frequency oscillator circuit 4 includes an oscillator Os, a first capacitor C1, a second capacitor C2, a inductor L, a first transistor Q1, a second transistor Q2, and an inverter In. The step-up transformer 5 includes two primary windings 51A and 51B divided at a neutral point M1, and a secondary winding 52.

The positive electrode of the direct-current power source DC is connected to one end of the inductor L, and the negative electrode is grounded. The first capacitor C1 is connected between the two electrodes of the direct-current power source DC. The other end of the inductor L is connected to the neutral point M1 between the primary windings 51A and 51B of the step-up transformer 5. The second capacitor C2 is connected between another terminal 53A of the first primary winding 51A and another terminal 53B of the second primary winding 51B. The terminal 53A of the first primary winding 51A is further connected to one end of the first transistor Q1. The terminal 53B of the second primary winding 51B is further connected to one end of the second transistor Q2. The other ends of the first transistor Q1 and the second transistor Q2 are both grounded. Here, the two transistors Q1 and Q2 are preferably MOSFETs, or alternatively, may be IGBTs or bipolar transistors. The oscillator Os is connected directly to the control terminal of the first transistor Q1, and through the inverter In to the control terminal of the second transistor Q2.

The direct-current power source DC maintains its output voltage Vi at a constant value (for example, 16 [V]). The first capacitor C1 maintains the input voltage Vi from the direct-current power source DC with stability. The oscillator Os sends pulses of a constant frequency (for example, 45 [kHz]) to the control terminals of the two transistors Q1 and Q2. The inverter In reverses the polarity of the pulses entered into the control terminal of the second transistor Q2 with respect to the polarity of the pulses entered into the control terminal of the first transistor Q1. Accordingly, the two transistors Q1 and Q2 are alternately turned on and off at the same frequency as the frequency of the oscillator Os. Thereby, the input voltage Vi is alternately applied to the primary windings 51A and 51B of the step-up transformer 5. The inductor L resonates with the second capacitor C2 at every application of the voltage, and then, the polarity of the secondary voltage V of the step-up transformer 5 is reversed at the same frequency as the frequency of the oscillator Os. Here, the RMS (root-mean-square) value of the secondary voltage V is substantially equal to the product of the voltage Vi applied to the primary windings 51A and 51B and the step-up ratio of the step-up transformer 5, that is, the turn ratio of the secondary winding 52 to the primary winding 51A. The RMS value of the secondary voltage V is preferably established on the order of the lamp voltage of the CCFL 20, for example, 1300 [V]. Thus, the first block 1 converts the output voltage Vi of the direct-current power source DC into an alternating voltage V of a high frequency, for example, 45 [kHz]. The frequency is hereafter referred to as a driving frequency of the CCFL 20. Here, the first block 1 may, not limited to the above-described parallel resonant push-pull inverter, be other type inverter (having a transformer).

Figure 4:
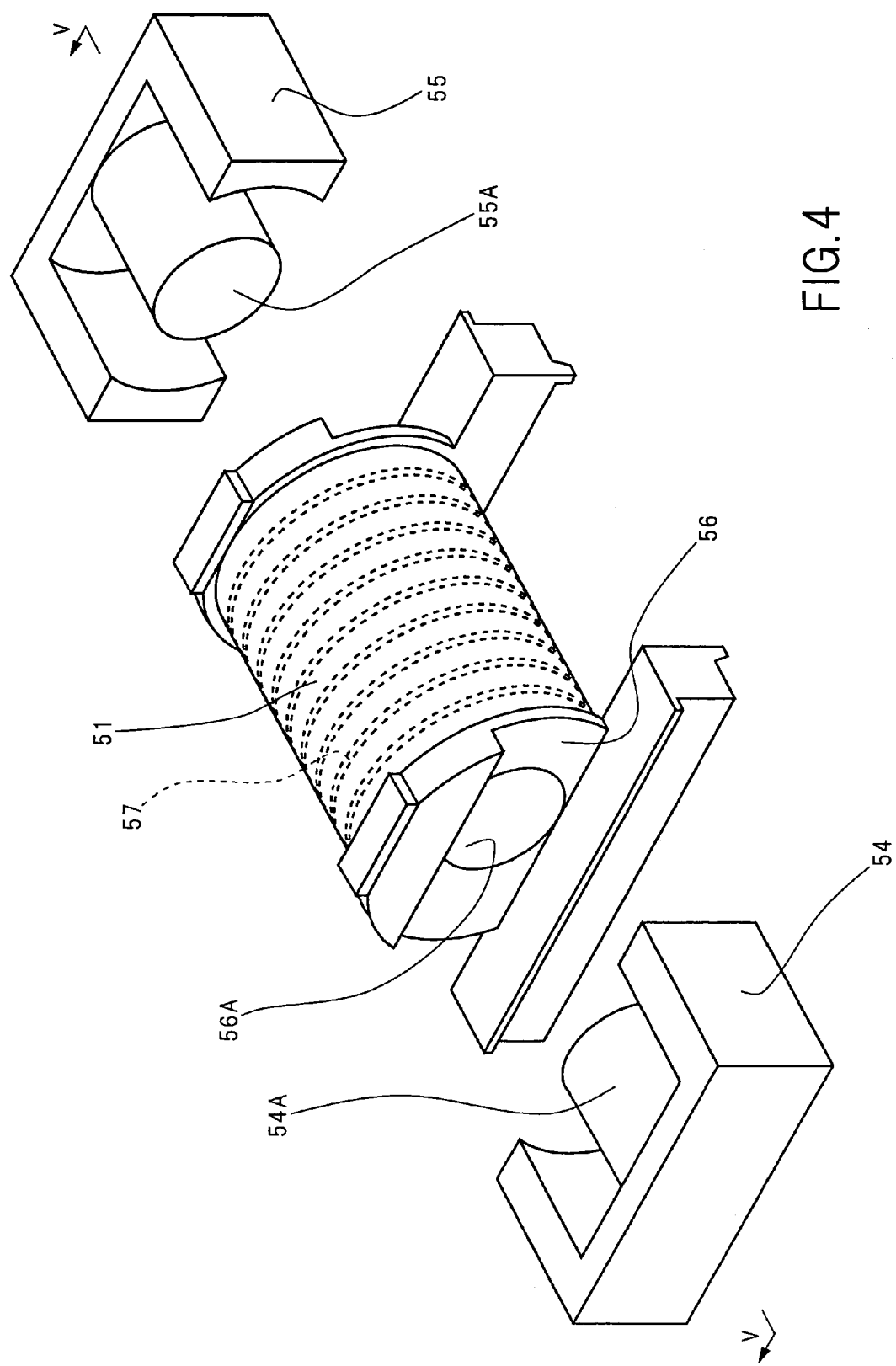
FIG. 4 is an exploded view schematically showing the structure of a step-up transformer 5 included in the CCFL driver circuit according to Embodiment 1 of the present invention.
Figure 5:
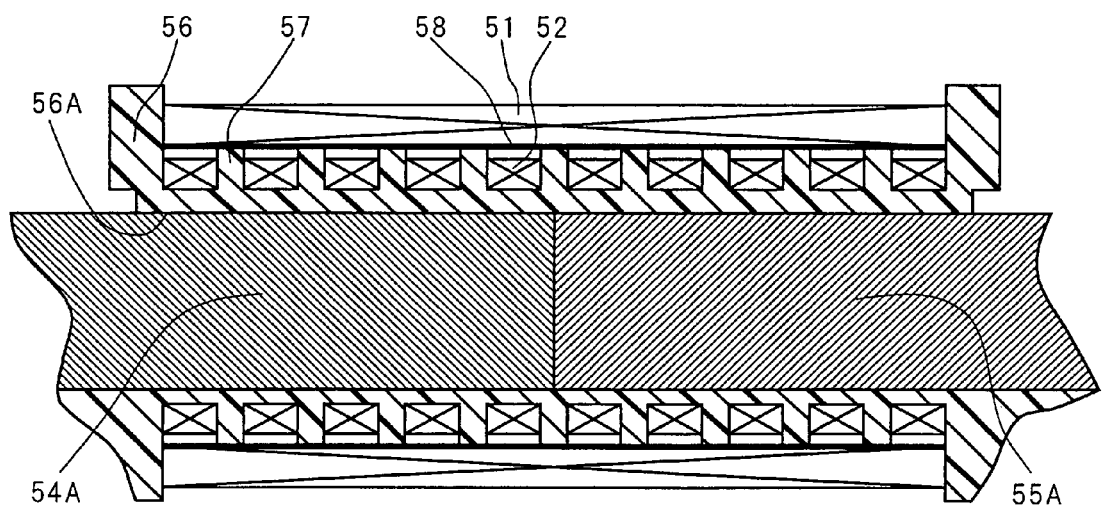
FIG. 5 is a cross-sectional view of the step-up transformer 5 taken along the line V—V shown in FIG. 4.

The leakage flux of the above-described step-up transformer 5 is suppressed in the CCFL driver circuit according to Embodiment 1 of the present invention, contrary to the premise with conventional circuits. Thereby, the first block 1 acts as a power supply with a low output impedance, that is, a low-impedance power supply. FIG. 4 is the exploded view schematically showing the structure of the step-up transformer 5. FIG. 5 is the cross-sectional view of the step-up transformer 5 taken along the line V—V shown in FIG. 4. The arrows shown in FIG. 4 represent the eye direction.

The step-up transformer 5 includes a primary winding 51 (the combination of the above-described two primary windings 51A and 51B), the secondary winding 52, two E-shaped cores 54 and 55, a bobbin 56, and an insulating tape 58. The bobbin 56 consists of, for example, a synthetic resin, and has a hollow cylinder form. Into its hollow 56A, the central projections 54A and 55A of the E-shaped cores 54 and 55 are inserted from the both openings, respectively.

On the outer surface of the bobbin 56, more than one partition 57 is uniformly spaced in the axial direction. First, the secondary winding 52 is wound between the partitions 57. Next, the insulating tape 58 is wrapped around the outside the secondary winding 52. Finally, the primary winding 51 is wound around the outside the insulating tape 58. Here, the secondary winding 52 may be wound on the outside of the primary winding 51, or both of the inside and outside of it. This piling up of the primary winding 51 and the secondary winding 52 remarkably reduces the leakage flux. Accordingly, the output impedance of the step-up transformer 5 is low. The output impedance is, in particular, established to be lower than the total impedance of all the parallel-connected CCFLs 20 (cf. FIG. 3). The secondary winding 52 is wound into the split winding structure as described above, in the above-described step-up transformer 5. Alternatively, the secondary winding may be wound into a honeycomb winding structure. Thereby, the line-to-line capacitances are suppressed, and the discharge between the lines of the winding is prevented. Accordingly, the self-resonant frequency of the secondary winding 52 can be established to be sufficiently high.

The second and third blocks 2 and 3 of the CCFL driver circuit block are connected to each of the CCFLs 20. See FIG. 3. The second block 2 includes a series connection of a ballast inductor LB and an overcurrent protection capacitor CP, and a matching capacitor CM. The third block 3 includes a joint section between the electrode at one end of the CCFL 20 and the ground terminal. One end of the secondary winding 52 of the step-up transformer 5 is connected, through the series connection of the ballast inductor LB and the overcurrent protection capacitor CP in each of the second blocks 2, to the electrode at one end of each CCFL 20. The other end of the secondary winding 52 is grounded. The electrode at the other end of each CCFL 20 is grounded through one of the third block 3. One of the matching capacitors CM is connected between the electrodes at the both ends of each CCFL 20.

The ballast inductor LB is, for example, a coil. Its inductance is, for example, on the order of 600 [mH]. The coil of the ballast inductor LB is preferably wound into a split (or honeycomb) winding structure in a manner similar to that of the secondary winding 52 of the step-up transformer 5. Thereby, its line-to-line capacitances are small, and then, its self-resonant frequency is sufficiently high. Preferably, the self-resonant frequency is sufficiently higher than the driving frequency of the CCFLs 20. More preferably, the ballast inductor LB includes a saturable reactor. Thereby, when discharge in the CCFL 20 is suddenly interrupted and then the voltage across the CCFL 20 sharply rises, the inductance of the ballast inductor LB is saturated, and therefore, further rise of voltage is suppressed. Thus, the CCFLs 20 and the CCFL driver circuit are protected from overvoltage.

The overcurrent protection capacitor CP acts as a buffer when the ballast inductor LB is short-circuited, and thereby, protects the CCFL 20 from overcurrent. The capacitance of the overcurrent protection capacitor CP is set to be, for example, on the order of 150 [pF]. Here, none of the overcurrent protection capacitors CP may be installed when there is a low possibility of an overcurrent.

The impedance of the series connection of the ballast inductor LB and the overcurrent protection capacitor CB is sufficiently higher than the output impedance of the first block 1. Accordingly, the CCFL driver circuit according to Embodiment 1 of the present invention has a high efficiency when the impedance of the series connection of the ballast inductor LB and the overcurrent protection capacitor CB is matched to the impedance of the CCFL 20. Furthermore, when the impedance matching is achieved for each CCFL 20, uniform lamp currents are maintained among more than one CCFL 20. In other words, more than one CCFL 20 can uniformly shine by the common power supply, that is, the first block 1.

However, various stray capacitances (not shown) exist around the CCFLs 20. The stray capacitances includes, for example, stray capacitances SC between the CCFLs 20 and the case 10 (cf. FIG. 2), and stray capacitances of the wirings connected between the first block 1, the second block 2, the third block 3, the CCFLs 20, and the ground conductor. Accordingly, the stray capacitances around the CCFLs 20 vary among the CCFLs 20. Then, the capacitance of the matching capacitor CM is established, for example, on the order of 20 [pF] in every second block 2. In particular, the differences in capacitance of the matching capacitors CM between the second blocks 2 cancel the differences in stray capacitance between the CCFLs 20. For example, a longer wiring generally has a larger stray capacitance, and accordingly, the matching capacitor CM connected to the CCFL 20 farther from the step-up transformer 5 is established to have a smaller capacitance. Thereby, the total impedances of the matching capacitors CM and the surrounding stray capacitances are substantially equal among more than one CCFL 20.

Under the conditions, the impedances of the matching capacitors CM, the ballast inductors LB, and the overcurrent protection capacitors CP are further adjusted. Thereby, the total impedance of the matching capacitor CM and the surrounding stray capacitance is matched to the impedance of the series connection of the ballast inductor LB and the overcurrent protection capacitor CP in each CCFL 20. Further preferably, the total impedance is matched to the impedance of the CCFL 20 during the shining conditions, which is, for example, 200 [kΩ]. Thus, the above-described impedance matching is achieved for every CCFL 20. As a result, uniform lamp currents are maintained among more than one CCFL 20 during the shining conditions. Therefore, more than one CCFL 20 shines at a uniform luminosity. Furthermore, the efficiency is high.

By the above-described impedance matching, when the CCFLs 20 shine, the uniform RMS values of the lamp currents are virtually maintained among more than one CCFL 20. That is understood as follows. The step-up transformer 5 has little leakage flux, and thereby, can be considered as an alternating voltage source with low output impedance. Furthermore, more than one CCFL 20 has in common the inductance L of the ballast inductor LB and the total capacitance C of the matching capacitor CM and the surrounding stray capacitances. Accordingly, only for any of the CCFLs 20, it should be understood that the RMS value of the lamp current is virtually independent of the impedance of the CCFL 20. Here, the capacitance of the overcurrent protection capacitor CP is sufficiently larger than the capacitance of the matching capacitor CM and the stray capacitances around the CCFL 20, and therefore, can be ignored in the following description.

Let R and I be the impedance and lamp current of the CCFL 20, respectively, and ω be the frequency of the secondary voltage V of the step-up transformer 5, that is, the driving frequency of the CCFL 20. At that time, the secondary voltage V of the step-up transformer 5 and the lamp current I satisfy the following equation (1):

$$V/I = R(1 - \omega^2 LC) + j\omega L. \qquad (1)$$

The above-described impedance matching is achieved between the ballast inductor LB and the above-described total capacitance C: $\omega L \approx 1/\omega C$. At that time, the first term of the right side of Eq. (1) is essentially canceled, and then, the ratio of the secondary voltage V of the step-up transformer 5 to the lamp current I is expressed as the following equation (2):

$$V/I \approx j\omega L. \qquad (2)$$

In other words, the actual lamp current I is determined only from common parameters among more than one CCFL 20, that is, the secondary voltage V of the step-up transformer 5, the inductance L of the ballast inductor LB, and the driving frequency ω of the CCFLs 20. In particular, the lamp current I is actually independent of the impedance R of the CCFL 20. Thus, uniform lamp currents are maintained among more than one CCFL 20 during the shining conditions, and therefore, the uniform luminosities are maintained.

Here, the impedance of the ballast inductor LB should be precisely matched to the total impedance of the matching capacitor CM and the surrounding stray capacitances, from the above-described viewpoint of the present invention to maintain uniform luminosities among more than one CCFL 20. In other words, the driving frequency ω of the CCFL 20 should be precisely equal to the resonant frequency ωc between the ballast inductor LB and the above-described total capacitance: $\omega \approx \omega c = 1/(LC)^{1/2}$. However, too precise an agreement between the driving frequency ω of the CCFL 20 and the above-described resonant frequency ωc may, in fact, be undesirable from a viewpoint different from the viewpoint of the present invention. For example, the amplitude of the lamp current is excessively amplified, and then, its stability deteriorates. As a result, the flicker of the CCFL 20 may become excessive. In order to avoid such conditions, preferably, the driving frequency ω of the CCFL 20 is set with a small deviation from the above-described resonant frequency ωc. Here, the difference between the driving frequency ω and the resonant frequency ωc is adjusted within the range where the uniformity in luminosity among more than one CCFL 20 is sufficiently maintained. Thereby, the essentially uniform and stable lamp currents are maintained among more than one CCFL 20.

Figure 6:
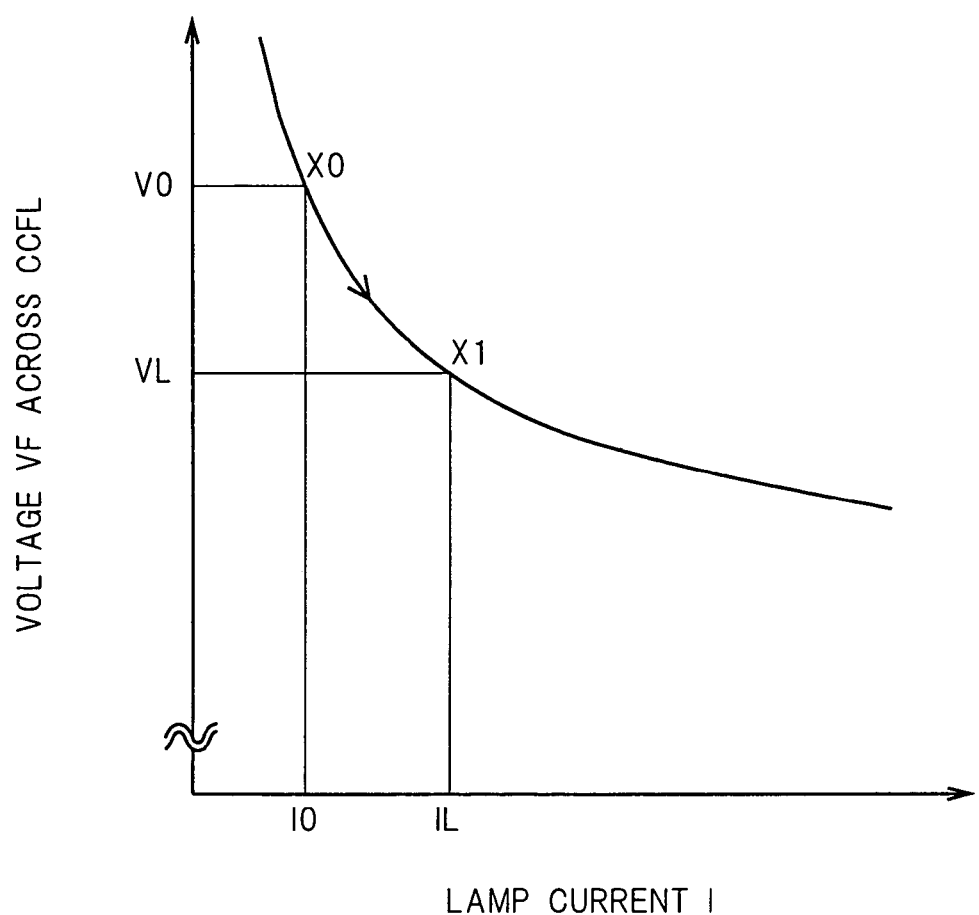
FIG. 6 is a graph showing the voltage-current characteristics of a CCFL 20.

When the CCFLs 20 stay out, the ballast inductor LB further functions as follows. FIG. 6 is the graph showing the voltage-current characteristics of the CCFL 20. The vertical axis shows the voltage VF across the CCFL 20, and the horizontal axis shows the lamp current I. The voltage VF across the CCFL 20 falls with the increase of the lamp current I, by the negative resistance characteristics of the CCFL 20. The lamp current I is a minute value I0 when the CCFL 20 stays out. Under the conditions, the secondary voltage is applied from the step-up transformer 5, and then the ballast inductor LB resonates with the matching capacitor CM. At that time, the electrodes at the both ends of the CCFL 20 are actually open, and hence, the ballast inductor LB resonates mainly with the matching capacitor CM. Thereby, the voltage VF of the CCFL 20 rises beyond the breakdown voltage V0, for example, 2000 [V]. See the point X0 shown in FIG. 6. Accordingly, in the CCFL 20, discharge starts between the electrodes at the both ends, and then, the lamp current I rises. In addition to that, the voltage VF across the CCFL 20 falls from the breakdown voltage V0 (see the arrow shown in FIG. 6), and stays with stability in the neighborhood of the lamp voltage VL of the CCFL 20, for example, 1300 [V]. See the point X1 shown in FIG. 6. At that time, the lamp current I is maintained with stability at a constant value IL, for example, 6 [mA].

In the CCFL driver circuit according to Embodiment 1 of the present invention, the impedances of the matching capacitors CM are separately established among more than one CCFL 20 to cancel the differences in stray capacitance. Alternatively, the impedances of the series connections of the ballast inductors LB and the overcurrent protection capacitors CP may be separately established among the CCFLs 20, instead of, or in addition to, the impedances of the matching capacitors CM, to cancel the differences in stray capacitance.

The leakage flux of the step-up transformer 5 is suppressed as described above, in the CCFL driver circuit according to Embodiment 1 of the present invention, contrary to the premises with conventional circuits. Instead, one ballast inductor LB and one matching capacitor CM are connected to each CCFL 20. In particular, those impedances are separately established for each CCFL 20, and cancel the differences in surrounding stray capacitance among more than one CCFL 20. As a result, among more than one CCFL 20, the lamp currents I have no variations, and then, the uniform and stable luminosities are maintained. Thus, the CCFL driver circuit according to Embodiment 1 of the present invention causes more than one CCFL 20 to shine with uniformity and stability using a single low-impedance power supply, that is, the first block 1. Furthermore, the wires between the first block 1 and the second blocks 2 may be long, and the wiring arrangements may greatly vary for each CCFL 20. The differences in stray capacitance by the variations in wiring are canceled by the differences in impedance of the ballast inductors LB or the matching capacitors CM. Accordingly, the CCFL driver circuit according to Embodiment 1 of the present invention has a high flexibility in layout of the wirings. Therefore, the miniaturization of the whole device is easily achieved.

In the CCFL driver circuit according to Embodiment 1 of the present invention, the second block 2 may include the ballast capacitor, instead of the ballast inductor LB. Here, the ballast capacitor has a comparatively small capacitance similar to that of the matching capacitor CM, which is on the order of several [pF]. Accordingly, the ballast capacitor and the matching capacitor CM are preferably provided as capacitances between the layers in the second circuit board 50. In addition, none of the matching capacitor CM may be installed when the ballast capacitors are used. Thus, size reductions of the second blocks 2 are easily achieved. Accordingly, the CCFL driver circuit according to Embodiment 1 of the present invention has the advantage, in particular, in thickness reduction of liquid crystal displays.

EMBODIMENT 2

A CCFL driver circuit according to Embodiment 2 of the present invention is installed into a liquid crystal display in a manner similar to that of the circuit according to the above-described Embodiment 1. The structure of the liquid crystal display is similar to the structure according to the above-described Embodiment 1, and hence, the description of the structure cites FIGS. 1 and 2 and the description for the above-described Embodiment 1.

Figure 7:
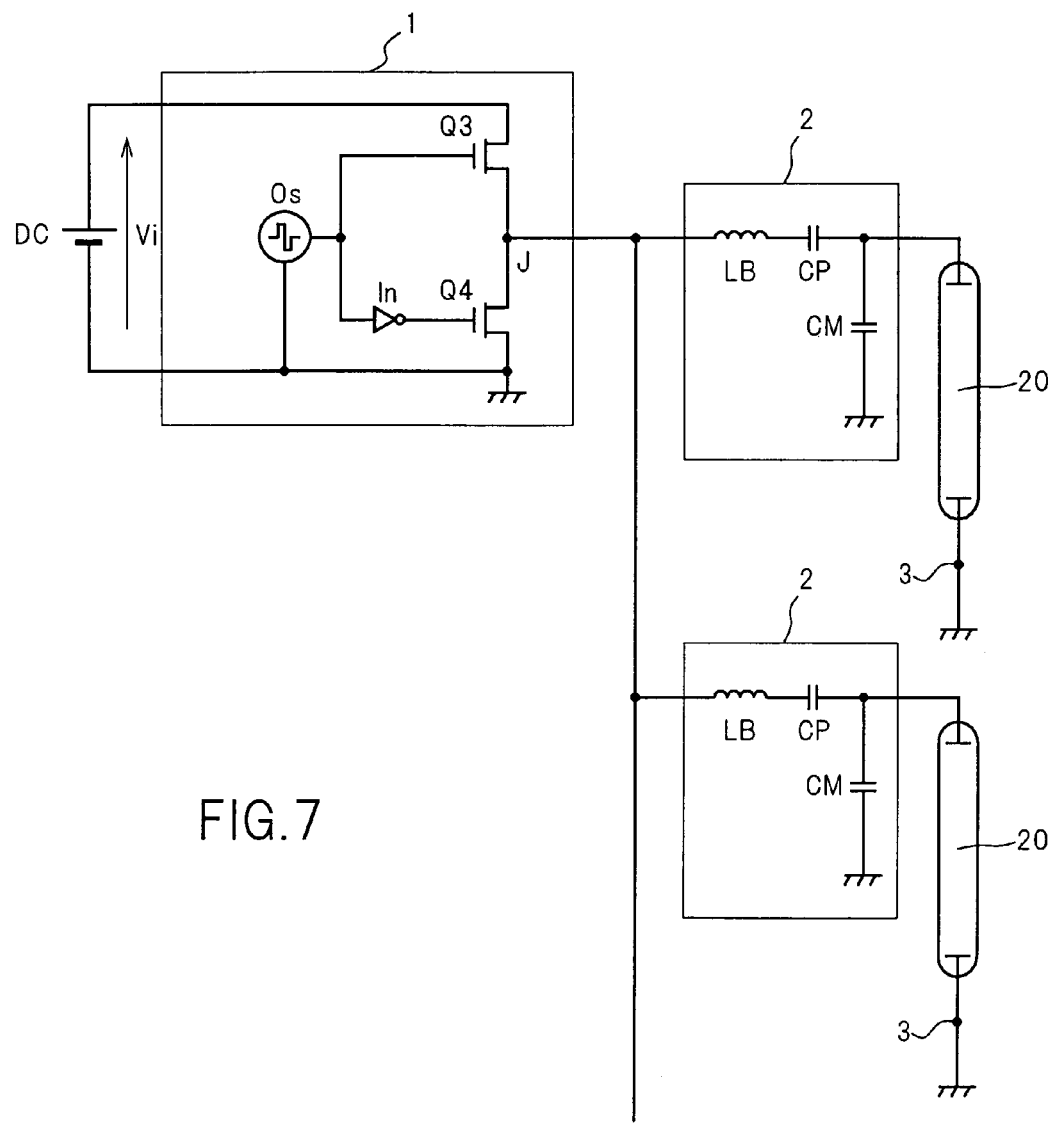
FIG. 7 is a circuit diagram showing the configuration of a CCFL driver circuit according to Embodiment 2 of the present invention.

FIG. 7 is the circuit diagram showing the configuration of the CCFL driver circuit according to Embodiment 2 of the present invention. The CCFL driver circuit comprises components similar to the components of the circuit according to Embodiment 1 (cf. FIG. 3), except the configuration of the first block 1. Accordingly, those similar components are marked with the same reference symbols as the reference symbols shown in FIG. 3, and the description of them cites the descriptions for Embodiment 1.

A first block 1 includes a oscillator Os, a high side power transistor Q3, a low side power transistor Q4, and an inverter In. The positive and negative electrodes of the direct-current power source DC are connected to one end of the high side power transistor Q3 and a ground terminal, respectively. The other end of the high side power transistor Q3 is connected to one end of the low side power transistor Q4, and the other end of the low side power transistor Q4 is grounded. Here, the high side power transistor Q3 and the low side power transistor Q4 are preferably MOSFETs, or alternatively, may be IGBTs or bipolar transistors. The oscillator Os is connected directly to the control terminal of the high side power transistor Q3, and through the inverter In to the control terminal of the low side power transistor Q4. A node J of the two power transistors Q3 and Q4 is connected through each of the second blocks 2 to the electrode at one end of each CCFL 20.

The direct-current power source DC maintains its output voltage Vi at a constant level. Here, the constant level is preferably on the order of the lamp voltage of the CCFL 20, for example, 1400 [V]. The oscillator Os sends the pulses of a constant frequency, for example, 45 [kHz], to the control terminals of the two power transistors Q3 and Q4. The inverter In reverses the polarity of the pulses entered into the control terminal of the low side power transistor Q4 with respect to the polarity of the pulses entered into the control terminal of the high side power transistor Q3. Accordingly, the two power transistors Q3 and Q4 are alternately turned on and off at the same frequency as the frequency of the oscillator Os. Thereby, the potential of the node J alternately takes either level of Vi or the ground potential ($\approx$0). Thus, the first block 1 converts the output voltage Vi of the direct-current power source DC into the alternating voltage of the high frequency, for example, 45 [kHz].

As described above, the output stage of the first block 1 consists of the power transistors Q3 and Q4, and hence, its output impedance is low. In other words, the first block 1 acts as a low-impedance power supply in the CCFL driver circuit according to Embodiment 2 of the present invention, in a manner similar to that of the circuit according to the above-described Embodiment 1. Accordingly, uniform and stable luminosities are maintained among more than one CCFL 20 by the settings of the impedances with the ballast inductors LB and the matching capacitors CM varying among the CCFLs 20 in a manner similar to that of the settings in Embodiment 1. Thus, the CCFL driver circuit according to Embodiment 2 of the present invention causes more than one CCFL 20 to shine with uniformity and stability using a single low-impedance power supply, that is, the first block 1. Furthermore, the flexibility in layout of the wirings is high since the wires between the first block 1 and the second blocks 2 may be long and the wiring may greatly vary for each CCFL 20. Therefore, the miniaturization of the whole device is easily achieved.

The second block 2 may include a ballast capacitor instead of the ballast inductor LB, in the CCFL driver circuit according to Embodiment 2 of the present invention. The ballast capacitor and the matching capacitor CM are preferably provided as a capacitance between the layers in the second circuit board 50. In addition, none of the matching capacitor CM may be installed when the ballast capacitors are used. Thus, size reductions of the second blocks 2 are easily achieved. Accordingly, the CCFL driver circuit according to Embodiment 2 of the present invention has advantages, in particular, in thickness reduction of liquid crystal displays.

EMBODIMENT 3

A CCFL driver circuit according to Embodiment 3 of the present invention is installed into a liquid crystal display in a manner similar to that of the circuit according to the above-described Embodiment 1. The structure of the liquid crystal display is similar to the structure according to the above-described Embodiment 1, and hence, the description of the structure cites FIGS. 1 and 2 and the description for the above-described Embodiment 1.

Figure 8:
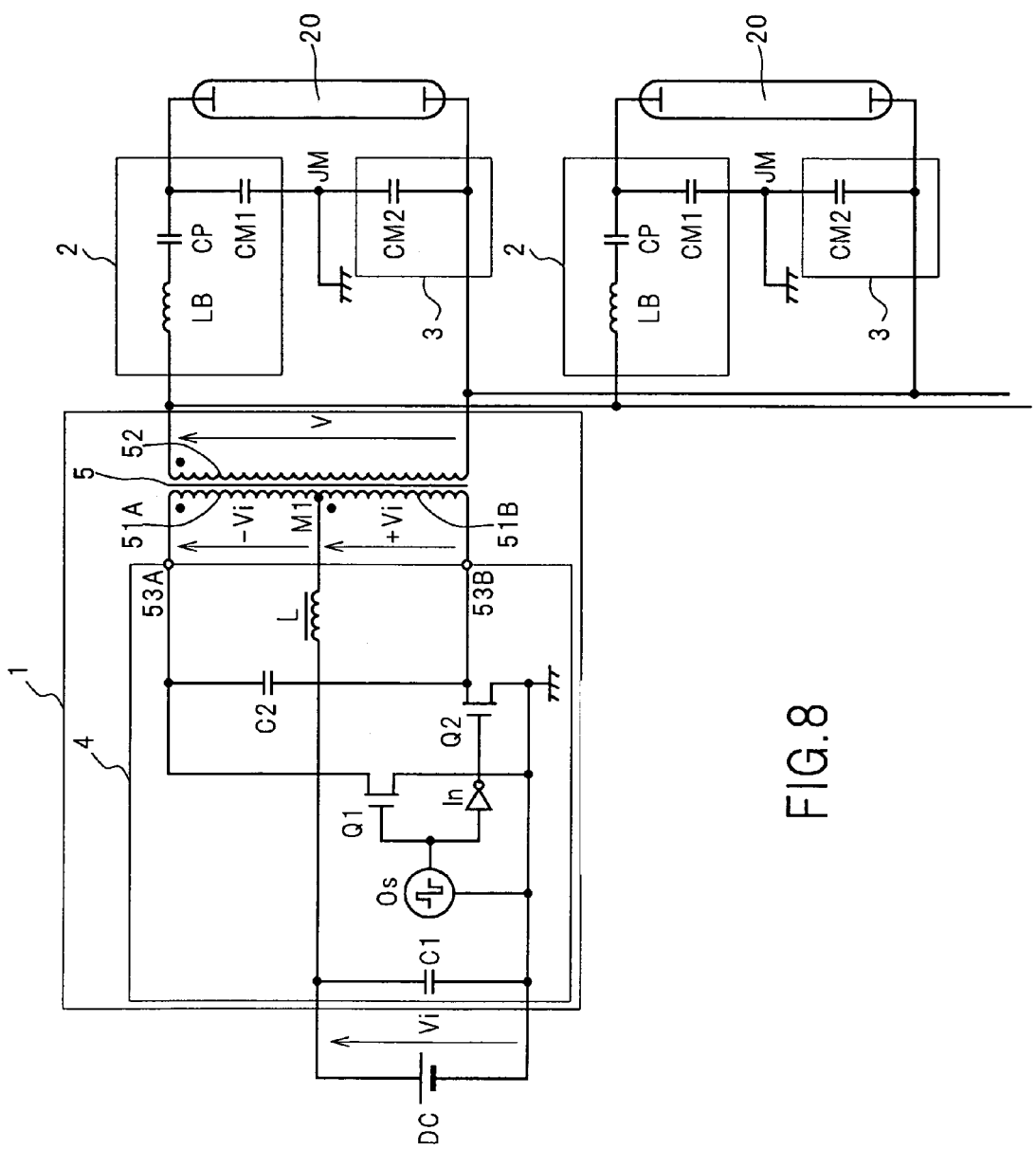
FIG. 8 is a circuit diagram showing the configuration of a CCFL driver circuit according to Embodiment 3 of the present invention.

FIG. 8 is the circuit diagram showing the configuration of the CCFL driver circuit according to Embodiment 3 of the present invention. The CCFL driver circuit comprises components similar to the components of the circuit according to Embodiment 1 (cf. FIG. 3), except the configuration of the second block 2 and the third block 3. Accordingly, those similar components are marked with the same reference symbols as the reference symbols shown in FIG. 3, and the description of them cites the descriptions for Embodiment 1.

In general, stray capacitances SC appear between the case 10 (or the reflector 30) grounded and the tube wall for each of the CCFLs 20. See FIG. 2. Under the structure of the CCFLs 20 with one grounded electrode like the CCFL driver circuit according to the above-described Embodiment 1, only the potential of the other electrode varies widely with respect to the potential of the case 10 (=the ground potential). Accordingly, when the stray capacitances SC between the case 10 and the tube wall are excessive, the leakage currents to flow between the case 10 and the tube wall increase excessively, in particular, in the vicinity of the above-described other electrode. Since the CCFLs 20 installed as the backlights of liquid crystal display are especially long, the excessive increase of the leakage currents is likely to impair the uniformity in lamp current along the length. As a result, the luminosity of each CCFL 20 is likely to vary along the length.

The center level of the electrode potentials of the both ends of the CCFL 20 is maintained at the ground potential to enhance the uniformity in luminosity along the length. At that time, the electrode potentials of the both ends are maintained to be anti-symmetric with respect to the ground potential (=the potential of the case 10), and in other words, the electrode potentials of the both ends equally changes with respect to the ground potential (=the potential of the case 10). Accordingly, in each CCFL 20, the distribution of leakage current to flow between the parts of the case 10 and the tube wall is symmetric with respect to the center of the CCFL 20. In particular, the variations of the luminosity along the length are reduced in each CCFL 20. Accordingly, the whole of each CCFL 20 shines at an essentially uniform luminosity. Furthermore, in the case where the center level of the electrode potentials of the both ends of the CCFL 20 is maintained at the ground potential, the amplitudes of the electrode potentials with respect to the ground potential can be reduced by half with the sufficiently large amplitude of the voltage across the CCFL 20 (for example, on the order of the lamp voltage) maintained, when compared with the case of the CCFLs 20 with the electrode at one end grounded. Thereby, the above-described leakage currents themselves are reduced, and hence, the variations of the distribution are further reduced. Accordingly, the variations in luminosity are reduced along the length in each CCFL 20.

In every CCFL 20, the center level of the electrode potentials of the both ends is maintained at the ground potential in the CCFL driver circuit according to Embodiment 3 of the present invention as follows. The second block 2 and the third block 3 include matching capacitors CM1 and CM2, respectively. Alternatively, either the second block 2 or the third block 3 may include all the matching capacitors CM1 and CM2. The capacitances of the two matching capacitor CM1 and CM2 are preferably on the order of 10 [pF]. The ratio between those capacitances is preferably established at 1:1. Those matching capacitors CM1 and CM2 are, more preferably, provided as capacitances between the layers in the second circuit board 50 and the third circuit board 60. The two matching capacitors CM1 and CM2 are connected in series and connected between the electrodes at the both ends of each CCFL 20. In particular, a node JM between the two matching capacitors CM1 and CM2 is grounded. One end of the secondary winding 52 of the step-up transformer 5 is connected, through each of the second blocks 2, to the electrode at one end of each CCFL 20. The other end of the secondary winding 52 is connected to the electrode at the other end of each CCFL 20.

In the CCFL driver circuit according to Embodiment 3 of the present invention, the node JM of the series connection of the matching capacitors CM1 and CM2 is grounded instead of one electrode of the CCFL 20, in contrast to the circuit according to the above-described Embodiment 1. Thereby, in every CCFL 20, the center level of the electrode potentials of the both ends is maintained at the ground potential. Accordingly, in every each CCFL 20, the uniformity in luminosity along the length further improves as described above.

In addition, the two matching capacitors CM1 and CM2 are connected in series, and hence, their respective withstand voltages can be reduced by half in the CCFL driver circuit according to Embodiment 3 of the present invention, when compared with the withstand voltages of the matching capacitors CM (cf. FIG. 3) according to the above-described Embodiment 1, which is, for example, on the order of the breakdown voltage of the CCFL 20. Accordingly, size reductions of those matching capacitors CM1 and CM2 are easily achieved.

The first block 1 acts as a low-impedance power supply in the CCFL driver circuit according to Embodiment 3 of the present invention, in a manner similar to that of the circuit according to the above-described Embodiment 1. Then, the impedances of the two matching capacitors CM1 and CM2, the ballast inductor LB, and the overcurrent protection capacitor CP are adjusted for each CCFL 20. Thereby, in each CCFL 20, the total impedance of the two matching capacitors CM1 and CM2 and the surrounding stray capacitance is matched to the impedance of the series connection of the ballast inductor LB and the overcurrent protection capacitor CP. More preferably, the total impedance is matched to the impedance of each CCFL 20 during the shining conditions, which is, for example, 200 [kΩ]. Thus, the above-described impedance matching is achieved in every CCFL 20. As a result, uniform lamp currents are maintained among more than one CCFL 20 during the shining conditions. Therefore, the CCFLs 20 shine at the uniform luminosity. Furthermore, the efficiency is high.

Thus, the CCFL driver circuit according to Embodiment 3 of the present invention causes more than one CCFL 20 to shine with uniformity and stability using a common low-impedance power supply, that is, the first block 1. Furthermore, the flexibility in layout of the wirings is high since the wires between the first block 1 and the second blocks 2 may be long and the wiring arrangement may greatly vary for each CCFL 20. Therefore, the miniaturization of the whole device is easily achieved.

In the CCFL driver circuit according to Embodiment 3 of the present invention, the second blocks 2 may include the ballast capacitors instead of the ballast inductors LB. The ballast capacitor and the matching capacitors CM1 and CM2 are preferably provided as capacitances between the layers in the second circuit board 50 or the third circuit board 60. Thus, size reductions of the second blocks 2 and the third blocks 3 are easily achieved, and therefore, the CCFL driver circuit according to Embodiment 3 of the present invention has advantages, in particular, in thickness reduction of the liquid crystal display.

EMBODIMENT 4

A. CCFL driver circuit according to Embodiment 4 of the present invention is installed into a liquid crystal display in a manner similar to that of the circuit according to the above-described Embodiment 1. The structure of the liquid crystal display is similar to the structure according to the above-described Embodiment 1, and hence, the description of the structure cites FIGS. 1 and 2 and the description for the above-described Embodiment 1.

Figure 9:
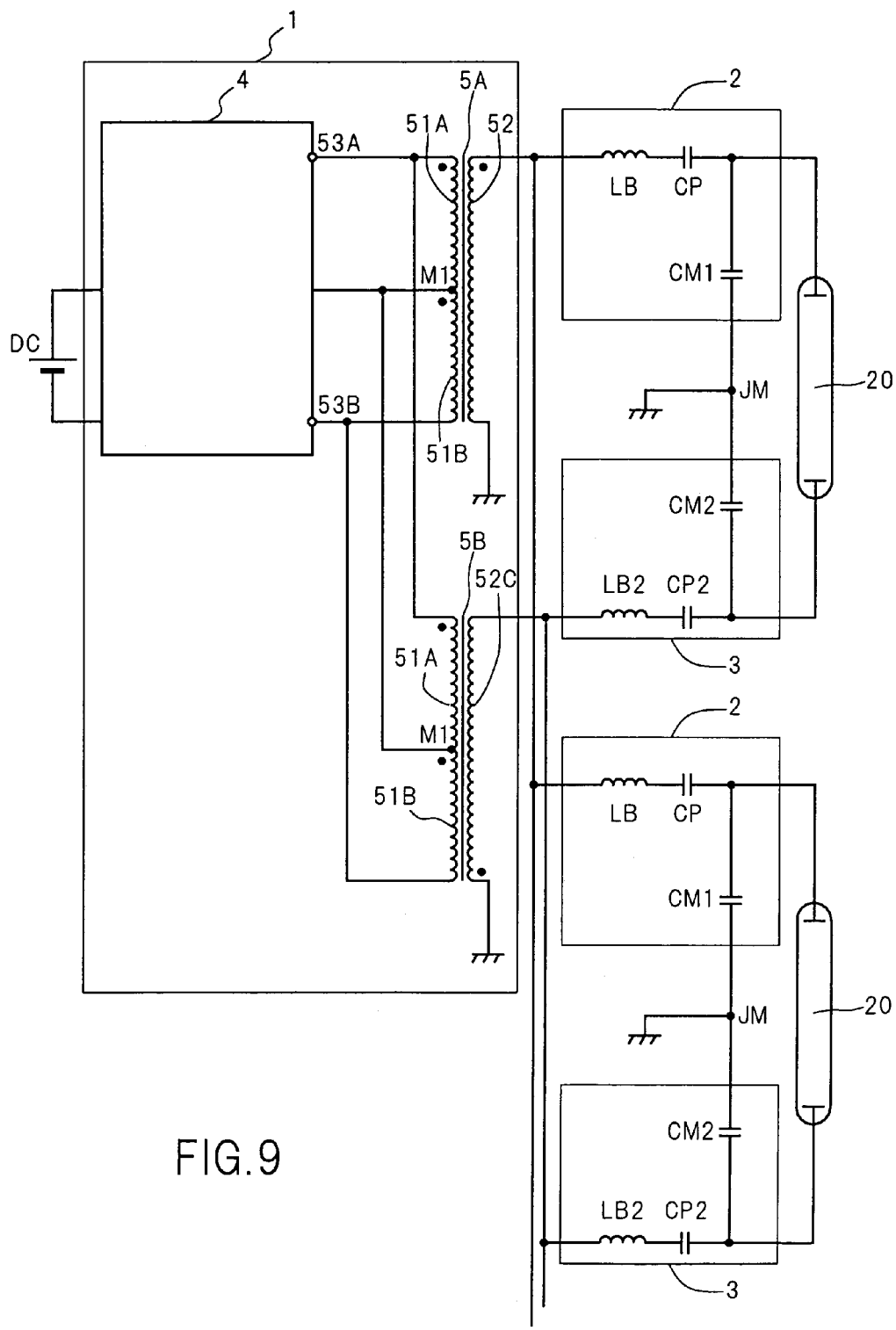
FIG. 9 is a circuit diagram showing the configuration of a CCFL driver circuit according to Embodiment 4 of the present invention.

FIG. 9 is the circuit diagram showing the configuration of the CCFL driver circuit according to Embodiment 4 of the present invention. The CCFL driver circuit comprises components similar to the components of the circuit according to Embodiment 3 (cf. FIG. 8), except the configuration of the first block 1 and the third block 3. Accordingly, those similar components are marked with the same reference symbols as the reference symbols shown in FIG. 8, and the description of them cites the descriptions for Embodiment 3.

In the CCFL driver circuit according to Embodiment 4 of the present invention, a first block 1 comprises two step-up transformers 5A and 5B, and a third block 3 comprises a series connection of a second ballast inductor LB2 and a second overcurrent protection capacitor CP2 as well as a second block 2, in contrast to the circuit according to the above-described Embodiment 3.

Any of the two step-up transformers 5A and 5B has a structure similar to that of the step-up transformer 5 according to the above-described Embodiment 1 (cf. FIGS. 4 and 5), and in particular, a small leakage flux. One end of the secondary winding 52 of a first step-up transformer 5A is connected through each of the second blocks 2 to the electrode at one end of each CCFL 20. The other end of the secondary winding 52 is grounded. One end of the secondary winding 52C of a second step-up transformer 5B is connected through each of the third blocks 3 to the electrode at the other end of each CCFL 20. The other end of the secondary winding 52C is grounded. Here, the two secondary windings 52 and 52C of the step-up transformers 5A and 5B are connected in reversed polarities to each other. Thereby, the electrode potentials of the both ends of each CCFL 20 change in opposite phases. Furthermore, the step-up ratios of the step-up transformers 5A and 5B are preferably established so that the RMS values of the secondary voltages of the step-up transformers 5A and 5B are on the order of a half of the lamp voltage of the CCFL 20. When the lamp voltage of the CCFL 20 is 1300 [V], for example, the RMS value of the secondary voltage is preferably established on the order of 600 [V].

The second ballast inductor LB2 is, for example, a coil. Its inductance is preferably equal to the inductance of the ballast inductor LB. More preferably, the inductances of the ballast inductors LB and LB2 are both on the order of 820 [mH]. The coil of the second ballast inductor LB2 is preferably wound in a split (or honeycomb) winding structure similar to that of the ballast inductor LB. Thereby, its self-resonant frequency is sufficiently high since its line-to-line capacitances are small. The self-resonant frequency is preferably sufficiently higher than the driving frequency of the CCFL 20.

The second ballast inductor LB2 further preferably includes a saturable reactor. Thereby, when discharge in the CCFL 20 is suddenly interrupted and the voltage across the CCFL 20 sharply rises, the inductance of the second ballast inductor LB2 is saturated. Accordingly, a further rise of the voltage is suppressed. Thus, the CCFLs 20 and the CCFL driver circuit are protected from overvoltage.

When the second ballast inductor LB2 is short-circuited, the second overcurrent protection capacitor CP2 acts as a buffer, and thereby, protects the CCFL 20 from overcurrent. The capacitance of the second overcurrent protection capacitor CP2 is established, for example, on the order of 150 [pF]. Here, none of the overcurrent protection capacitors CP and CP2 may be installed when the possibility of an occurrence of overcurrent is low.

The first block 1 acts as a low-impedance power supply in the CCFL driver circuit according to Embodiment 4 of the present invention, in a manner similar to that of the circuit according to the above-described Embodiment 3. Then, the impedances of the ballast inductor LB, the second ballast inductor LB2, and the two matching capacitors CM1 and CM2 are further established for each CCFL 20. Thereby, in every CCFL 20, the total impedance of one matching capacitor CM1 and the surrounding stray capacitances is matched to the impedance of the series connection of the ballast inductor LB and the overcurrent protection capacitor CP. Furthermore, in every CCFL 20, the total impedance of the other matching capacitor CM2 and the surrounding stray capacitances is matched to the impedance of the series connection of the second ballast inductor LB2 and the second overcurrent protection capacitor CP2. More preferably, the total impedances are each matched to a half of the impedance of the CCFL 20 during the shining conditions. As a result, uniform and stable luminosities are maintained among more than one CCFL 20, in a manner similar to that of the above-described Embodiment 3.

Thus, the CCFL driver circuit according to Embodiment 4 of the present invention causes more than one CCFL 20 to shine with uniformity and stability using a common low-impedance power supply, that is, the first block 1. Furthermore, the flexibility in layout of the wirings is high since any of the wires between the first block 1 and the second blocks 2 and the wires between the first block 1 and the third blocks 3 may be long, and the wiring arrangement may greatly vary for each CCFL 20. Therefore, the miniaturization of the whole device is easily achieved.

A step-up transformer is divided into two transformers 5A and 5B, and then installed in the CCFL driver circuit according to Embodiment 4 of the present invention. Furthermore, their secondary voltages are maintained with the same amplitudes and in opposite phases. Thereby, for each CCFL 20, the center level of the electrode potentials of the both ends is maintained at the ground potential. Accordingly, in every CCFL 20, the uniformity in luminosity along the length is further improved. In addition, the withstand voltages of the step-up transformers 5A and 5B are reduced by half, when compared with the withstand voltage of the step-up transformer 5 (cf. FIG. 8) according to the above-described Embodiment 3. Accordingly, size reductions of the step-up transformers 5A and 5B are easily achieved, when compared with the step-up transformer 5 according to the above-described Embodiment 3. In particular, the heights of the step-up transformers 5A and 5B can be reduced by half when compared with the height of the step-up transformer 5 due to above-described Embodiment 3. Similarly, since the two matching capacitors CM1 and CM2 are connected in series, their withstand voltages can be reduced by half, when compared with the withstand voltage of the matching capacitor CM according to the above-described Embodiment 1 (cf. FIG. 3). Accordingly, size reductions of those matching capacitors CM1 and CM2 are easily achieved. Thus, the CCFL driver circuit according to Embodiment 4 of the present invention has advantages, in particular, in thickness reduction of the liquid crystal display.

The first block 1 is mounted on the first circuit board 40, and separated from the second blocks 2 and the third blocks 3 in the CCFL driver circuit according to Embodiment 4 of the present invention. Alternatively, the first block 1 may be mounted on the second circuit board 50, as well as the second blocks 2. The CCFL driver circuit mounted on the second circuit board 50 is sufficiently thin since the step-up transformers 5A and 5B are lower than the step-up transformer 5 according to the above-described Embodiment 3. Accordingly, the liquid crystal display can be sufficiently slimmed down.

The second blocks 2 and the third blocks 3 may include ballast capacitors, instead of the ballast inductors LB and LB2, in the CCFL driver circuit according to Embodiment 4 of the present invention. The ballast capacitor and the matching capacitors CM1 and CM2 are preferably provided as capacitances between the layers in the second circuit board 50 or the third circuit board 60. Furthermore, when the ballast capacitors are used, none of the matching capacitors CM1 and CM2 may be installed. Thus, since size reductions of the second blocks 2 and the third blocks 3 are easily achieved, the CCFL driver circuit according to Embodiment 4 of the present invention has advantages, in particular, in thickness reduction of the liquid crystal display.

EMBODIMENT 5

Figure 10:
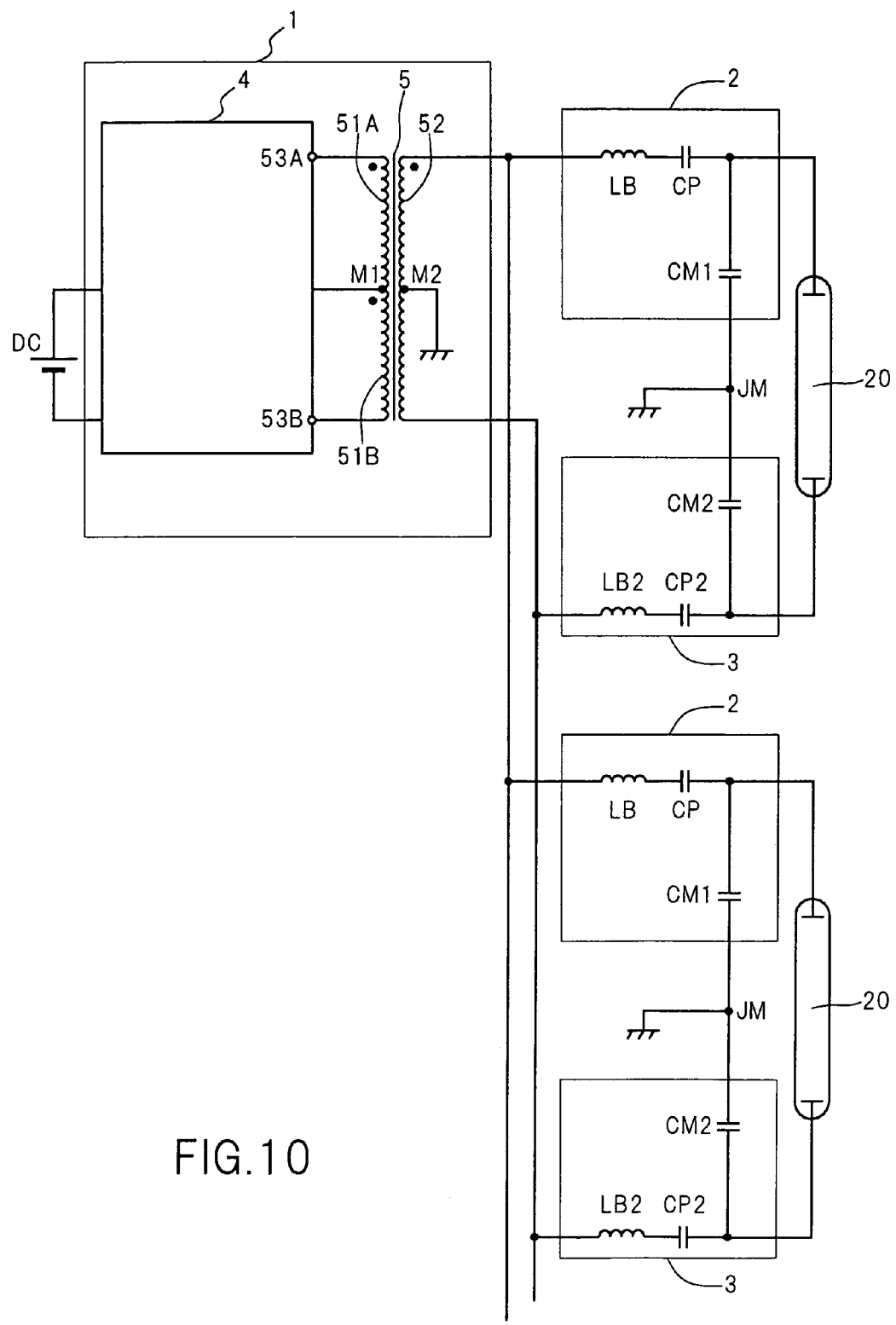
FIG. 10 is a circuit diagram showing the configuration of a CCFL driver circuit according to Embodiment 5 of the present invention.

A CCFL driver circuit according to Embodiment 5 of the present invention is installed into a liquid crystal display in a manner similar to that of the circuit according to the above-described Embodiment 1. The structure of the liquid crystal display is similar to the structure according to the above-described Embodiment 1, and hence, the description of the structure cites FIGS. 1 and 2 and the description for the above-described Embodiment FIG. 10 is the circuit diagram showing the configuration of the CCFL driver circuit according to Embodiment 5 of the present invention. The CCFL driver circuit comprises components similar to the components of the circuit according to Embodiment 4 (cf. FIG. 9), except the configuration of the step-up transformer 5. Accordingly, those similar components are marked with the same reference symbols as the reference symbols shown in FIG. 9, and the description of them cites the descriptions for Embodiment 1.

In the CCFL driver circuit according to Embodiment 5 of the present invention, the center level of the electrode potentials of the both ends of each CCFL 20 is maintained at the ground potential as follows. One step-up transformer 5 is provided in a manner similar to that of the above-described Embodiment 1. See FIG. 3. However, the step-up transformer 5 includes two secondary windings 52A and 52B divided at a neutral point M2, in contrast to that according to the above-described Embodiment 1. One end of the first secondary winding 52A is connected, through each of the second blocks 2, to the electrode at one end of each CCFL 20. One end of the first secondary winding 52B is connected to the electrode at the other end of each CCFL 20. The neutral point M2 of the secondary windings 52A and 52B is grounded. Thus, since the center level of the electrode potentials of the both ends is maintained at the ground potential in each CCFL 20, the uniformity in luminosity along the length is further improved in every CCFL 20, as described above.

The first block 1 acts as a low-impedance power supply in the CCFL driver circuit according to Embodiment 5 of the present invention in a manner similar to that of the circuit according to the above-described Embodiment 4. Accordingly, uniform and stable luminosities are maintained among more than one CCFL 20, by the setting of the impedances of the two ballast inductors LB and LB2 and the two matching capacitors CM1 and CM2 for each CCFL 20, which is similar to the setting in Embodiment 4. Thus, the CCFL driver circuit according to Embodiment 5 of the present invention causes more than one CCFL 20 to shine with uniformity and stability using a common low-impedance power supply, that is, the first block 1. Furthermore, the flexibility in layout of the wirings is high since the wires between the first block 1 and the second blocks 2 may be long and the wiring arrangement may greatly vary in each CCFL 20. Therefore, the miniaturization of the whole device is easily achieved.

The second blocks 2 and the third blocks 3 may include ballast capacitors instead of the ballast inductors LB and LB2, in the CCFL driver circuit according to Embodiment 5 of the present invention. The ballast capacitor and the matching capacitors CM1 and CM2 are preferably provided as capacitances between the layers in the second circuit board 50 or the third circuit board 60. Furthermore, when the ballast capacitors are used, none of the matching capacitors CM1 and CM2 may be installed. Thus, since size reductions of the second blocks 2 and the third blocks 3 are easily achieved, the CCFL driver circuit according to Embodiment 5 of the present invention has advantages, in particular, in thickness reduction of the liquid crystal display.

EMBODIMENT 6

A CCFL driver circuit according to Embodiment 6 of the present invention is installed into a liquid crystal display in a manner similar to that of the circuit according to the above-described Embodiment 1. The structure of the liquid crystal display is similar to the structure according to the above-described Embodiment 1, and hence, the description of the structure cites FIGS. 1 and 2 and the description for the above-described Embodiment 1.

Figure 11:
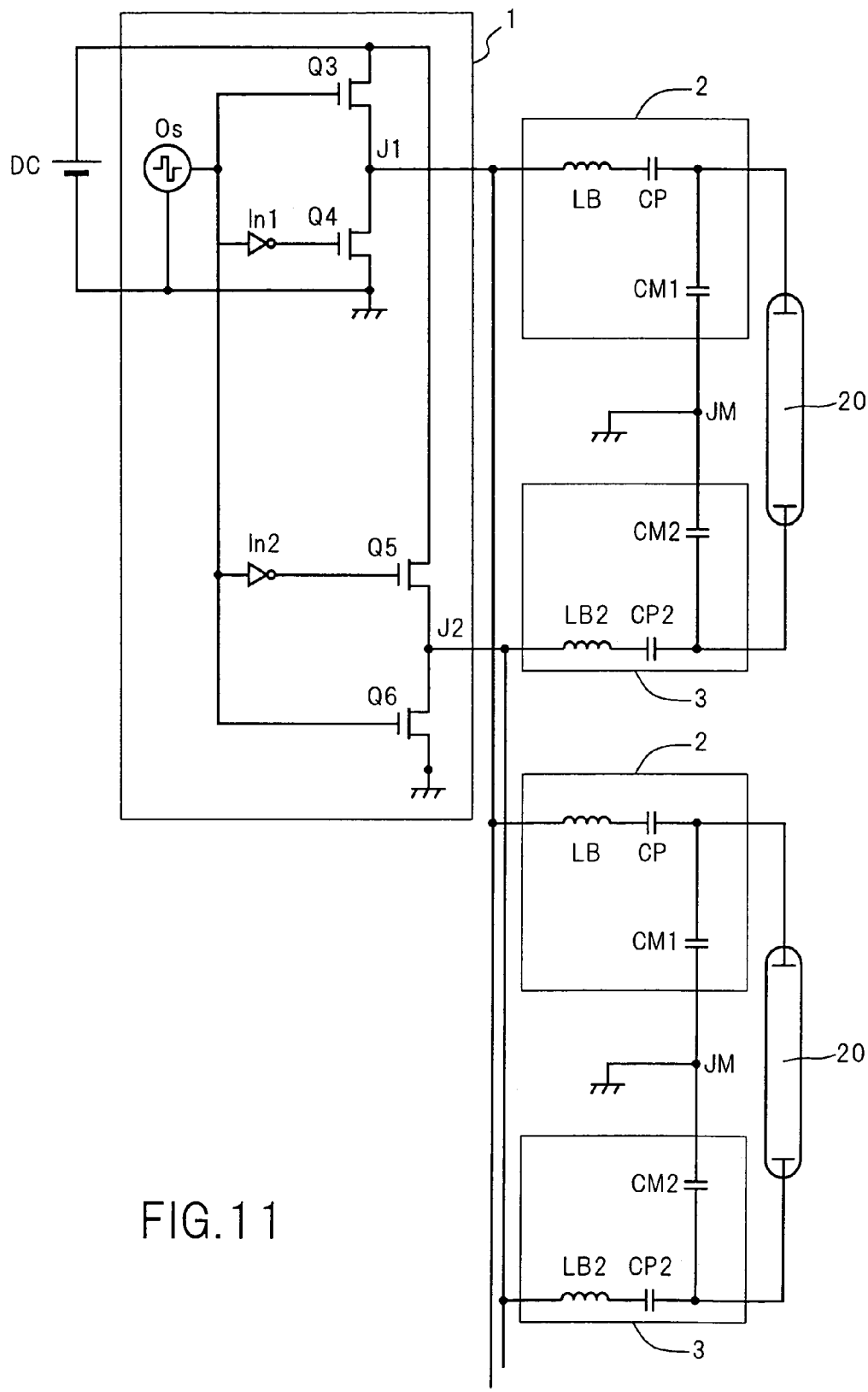
FIG. 11 is a circuit diagram showing the configuration of a CCFL driver circuit according to Embodiment 6 of the present invention.
Figure 12:
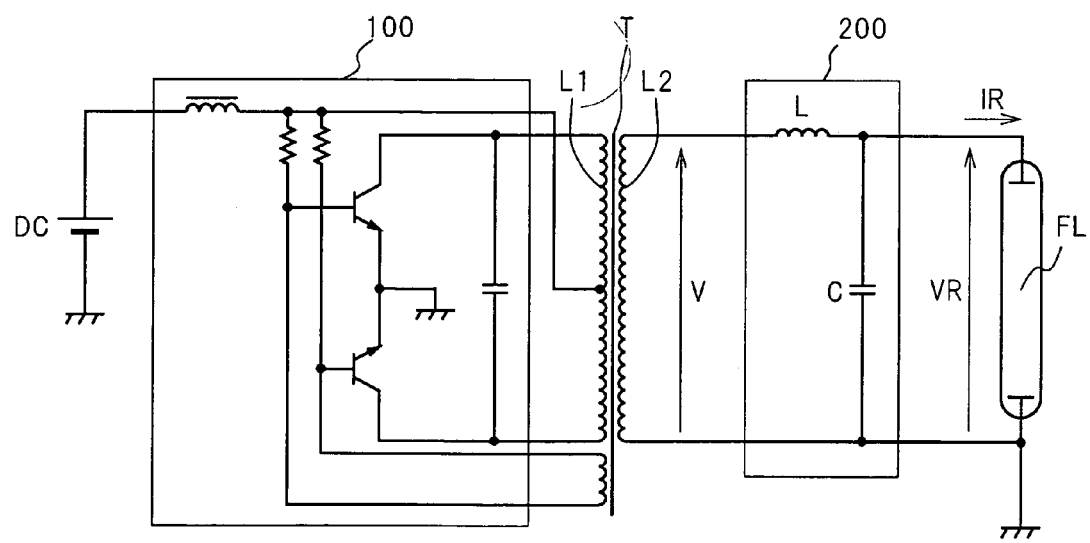
FIG. 12 is the circuit diagram showing the configuration of the conventional CCFL driver circuit.
Figure 13:
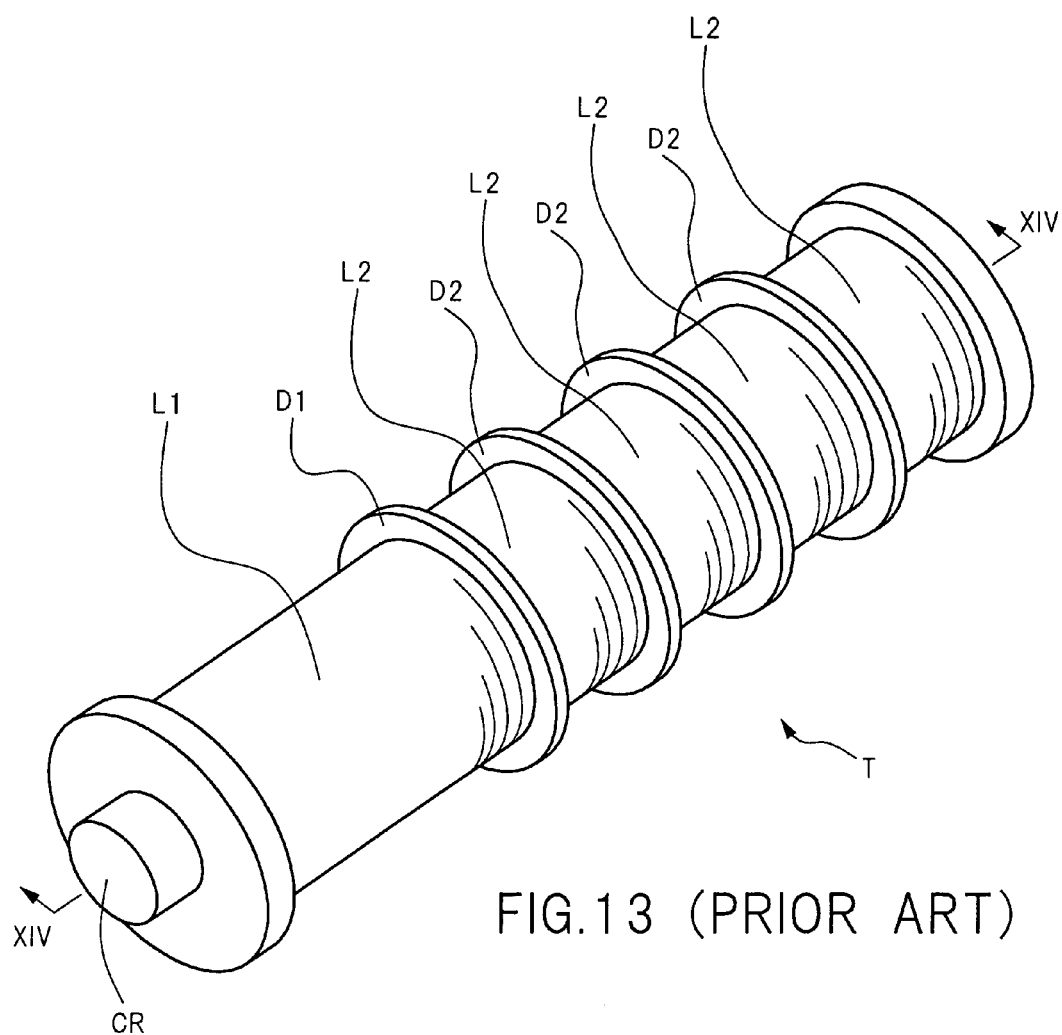
FIG. 13 is the perspective view schematically showing the appearance of the leakage transformer used in the conventional CCFL driver circuit.
Figure 14:
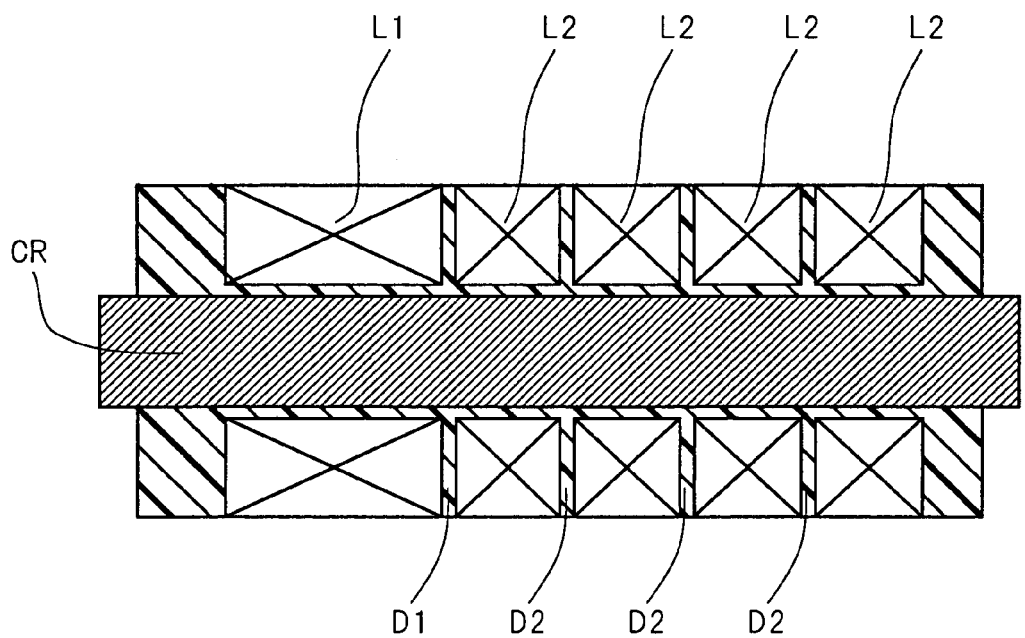
FIG. 14 is the cross-sectional view of the leakage transformer taken along the line XIV—XIV shown in FIG. 13.

FIG. 11 is the circuit diagram showing the configuration of the CCFL driver circuit according to Embodiment 6 of the present invention. The CCFL driver circuit comprises components similar to the components of the circuit according to Embodiment 4 (cf. FIG. 9), except the configuration of the first block 1. Accordingly, those similar components are marked with the same reference symbols as the reference symbols shown in FIG. 9, and the description of them cites the descriptions for Embodiment 4.

In the CCFL driver circuit according to Embodiment 6 of the present invention, the first block 1 comprises two pairs of series connections of two power transistors, each similar to the series connection in the first block 1 (cf. FIG. 7) according to the above-described Embodiment 2, in contrast to the circuit according to the above-described Embodiment 4. The first block 1 further includes an oscillator Os and two inverters In1 and In2. The positive electrode of the direct-current power source DC is connected to one end of each of two high side power transistors Q3 and Q5. The negative electrode of the direct-current power source DC is grounded. The other end of the first high side power transistor Q3 is connected to one end of the first low side power transistor Q4, and the other end of the first low side power transistor Q4 is grounded. The other end of the second high side power transistor Q5 is connected to one end of the second low side power transistor Q6, and the other end of the second low side power transistor Q6 is grounded. Here, the four power transistors Q3, Q4, Q5, and Q6 are preferably MOSFETs, or alternatively, may be IGBTs or bipolar transistors. The oscillator Os is directly connected to the control terminals of the first high side power transistor Q3 and the second low side power transistor Q6, and on the other hand, connected through the first inverter In1 to the control terminal of the first low side power transistor Q4, and connected through the second inverter In2 to the control terminal of the second high side power transistor Q5. The first node J1 between the first high and low side power transistors Q3 and Q4 is connected through each of the second blocks 2 to the electrode at one end of each CCFL 20. The second node J2 between the second high and low side power transistors Q5 and Q6 is connected through each of the third blocks 3 to the electrode at the other end of each CCFL 20.

The direct-current power source DC maintains its output voltage Vi at a constant level. Here, the constant level is preferably on the order of a half of the lamp voltage of the CCFL 20, for example, 700 [V]. The oscillator Os sends the pulses of a constant frequency, for example, 45 [kHz] to the control terminals of the four power transistors Q3, Q4, Q5, and Q6. The first inverter In1 reverses the polarity of the pulses entered into the control terminal of the first low side power transistor Q4 with respect to the polarity of the pulses entered into the control terminal of the first high side power transistor Q3. Similarly, the second inverter In2 reverses the polarity of the pulses entered into the control terminal of the second high side power transistor Q5 with respect to the polarity of the pulses entered into the control terminal of the second low side power transistor Q6. Accordingly, the first high side power transistor Q3 and the second low side power transistor Q6 turn on and off in phase, and the first low side power transistor Q4 and the second high side power transistor Q5 turn on and off in phase. Furthermore, the high side power transistors Q3, Q5 and the low side power transistors Q4, Q6 alternately turn on and off at the same frequency as the frequency of the oscillator Os. Thereby, the potentials of the first node J1 and the second node J2 change in opposite phases. Thus, the first block 1 converts the output voltage Vi of the direct-current power source DC into the alternating voltage of the high frequency, for example, 45 [kHz].

As described above, the output stage of the first block 1 has a low output impedance since it consists of the four power transistors Q3, Q4, Q5, and Q6. In other words, the first block 1 acts as a low-impedance power supply in the CCFL driver circuit according to Embodiment 6 of the present invention, in a manner similar to that of the circuit according to the above-described Embodiment 4. Accordingly, uniform and stable luminosities are maintained among more than one CCFL 20 by the setting of the impedances of the ballast inductors LB and LB2 and the matching capacitors CM1 and CM2 for each CCFL 20, which is similar to the setting in Embodiment 4. Thus, the CCFL driver circuit according to Embodiment 6 of the present invention causes more than one CCFL 20 to shine with uniformity and stability using a common low-impedance power supply, that is, the first block 1. Furthermore, the flexibility in layout of the wirings is high since the wires between the first block 1 and the second blocks 2 and the wires between the first block 1 and the third blocks 3 may be long and the wiring arrangement may greatly vary for each CCFL 20. Therefore, the miniaturization of the whole device is easily achieved.

The power transistors are divided into two pairs and installed in the CCFL driver circuit according to Embodiment 6 of the present invention, in contrast to the circuit according to the above-described Embodiment 2. Furthermore, their output voltages are maintained with the same amplitudes and in opposite phases. Thereby, the center level of the electrode potentials of the both ends is maintained at the ground potential in every CCFL 20. Accordingly, the uniformity in luminosity along the length is further improved for every CCFL 20. In addition, the withstand voltages of the power transistors Q3, Q4, Q5, and Q6 are reduced by half when compared to the withstand voltages of the power transistors according to the above-described Embodiment 2. Accordingly, the construction of the power transistors is comparatively easy. Similarly, since the two matching capacitors CM1 and CM2 are connected in series, their respective withstand voltages can be reduced by half when compared the withstand voltages of the matching capacitors CM (cf. FIG. 3) according to the above-described Embodiment 1. Therefore, size reductions of the matching capacitors CM1 and CM2 are easily achieved.

In the CCFL driver circuit according to Embodiment 6 of the present invention, the second blocks 2 and the third blocks 3 may include a ballast capacitor instead of the ballast inductors LB and LB2. The ballast capacitor and the matching capacitors CM1 and CM2 are preferably provided as capacitances between the layers in the second circuit board 50 or the third circuit board 60. Furthermore, when the ballast capacitors are used, none of the matching capacitors CM1 and CM2 may be installed. Thus, since size reductions of the second blocks 2 and the third blocks 3 are easily achieved, the CCFL driver circuit according to Embodiment 6 of the present invention has advantages, in particular, in thickness reduction of the liquid crystal display.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

The CCFL driver circuits according to the present invention are, for example, installed in liquid crystal displays as driving devices of backlight, and as described above, adopt a low-impedance power supply and establish ballasts for each CCFL. As clearly understood from this, the present invention has industrial applicability.

The invention claimed is:

1. A cold cathode fluorescent lamp (CCFL) driver circuit comprising:
    more than one ballast, at least one of which is connected to at least an electrode at one end of each of more than one CCFL; and
    a low-impedance power supply powering said CCFL through said ballast and having an output impedance lower than the total impedance of said CCFLs.

2. A CCFL driver circuit according to claim 1 wherein said low-impedance power supply comprises a transformer connected to said ballast and having an output impedance lower than the total impedance of said CCFLs.

3. A CCFL driver circuit according to claim 2 wherein said transformer includes a core, a primary winding wound around the core, and a secondary winding wound on at least one of the inside and outside of the primary winding.

4. A CCFL driver circuit according to claim 3 wherein said secondary winding has one of split and honeycomb winding structures.

5. A CCFL driver circuit according to claim 1 wherein said low-impedance power supply comprises a power transistor connected to said ballast.

6. A CCFL driver circuit according to claim 1 wherein said ballast includes an inductor.

7. A CCFL driver circuit according to claim 6 wherein said inductor comprises one of split and honeycomb coils.

8. A CCFL driver circuit according to claim 6 wherein said inductor includes a saturable reactor.

9. A CCFL driver circuit according to claim 1 wherein said ballast includes a capacitor.

10. A CCFL driver circuit according to claim 9 wherein said capacitor includes a capacitance between layers in a circuit board.

11. A CCFL driver circuit according to claim 1 comprising matching capacitors, at least one of which is connected between the electrodes at the both ends of each of said CCFLs.

12. A CCFL driver circuit according to claim 11 wherein said matching capacitor includes a capacitance between layers in a circuit board.

13. A CCFL driver circuit according to claim 11 wherein the impedance of said matching capacitor is matched to the impedance of said ballast.

14. A CCFL driver circuit according to claim 11 wherein the impedance of said ballast, the total impedance of said matching capacitor and a stray capacitance around said CCFL, and the impedance of said CCFL during the shining conditions are matched to each other.

15. A CCFL driver circuit according to claim 1 comprising matching capacitors, at least one of which is connected between a ground and each of the electrodes at the both ends of said CCFLs.

16. A CCFL driver circuit according to claim 1 comprising two of said low-impedance power supplies, wherein:
    one of said ballasts is connected to each of the electrodes at the both ends of said CCFLs; and
    each of said low-impedance power supplies is connected, through one of said ballasts, to one of the electrodes at the both ends of said CCFLs, and the outputs of said low-impedance power supplies are maintained in opposite phases.

17. A CCFL driver circuit according to claim 16 wherein:
    said low-impedance power supplies are mounted on a first circuit board;
    said ballasts connected to the electrodes at one-side ends of said CCFLs are mounted on a second circuit board; and
    said ballasts connected to the electrodes at the other-side ends of said CCFLs are mounted on a third circuit board.

18. A CCFL driver circuit according to claim 17 wherein one end of said CCFL is fixed on said second circuit board and the other end of said CCFL is fixed on said third circuit board.

19. A CCFL driver circuit according to claim 16 wherein:
    said low-impedance power supplies and said ballasts connected to the electrodes at one-side ends of said CCFLs are mounted on a first circuit board; and
    said ballasts connected to the electrodes at the other-side ends of said CCFLs are mounted on a second circuit board.

20. A CCFL driver circuit claim 2 wherein:
    one of said ballasts is connected to each of the electrodes at the both ends of said CCFLs; and
    said transformer includes a secondary winding with a neutral point grounded, each end of which is connected to one of the electrodes at the both ends of said CCFLs through one of said ballasts.

21. A liquid crystal display comprising:
    more than one CCFL;
    a liquid crystal panel installed in front of said CCFLs and interrupting lights emitted from said CCFLs in a predetermined pattern; and
    a CCFL driver circuit including:
        more than one ballast, at least one of which is connected to at least an electrode at one end of each of said CCFLs; and
        a low-impedance power supply powering said CCFLs through said ballasts and having an output impedance lower than the total impedance of said CCFLs.

* * * * *